United States Patent

Torii et al.

[11] Patent Number: 5,875,588
[45] Date of Patent: Mar. 2, 1999

[54] DEVICE FOR DETECTING POSITION OF MOVING BODY AND VEHICLE DOOR

[75] Inventors: Katsuhiko Torii, Hamana-gun; Keizo Ishizu, Hamamatsu; Masaki Fukuzawa, Okazaki, all of Japan

[73] Assignees: Asmo Co., Ltd.; Toyota Jidosha Kabushiki Kaisha, both of Japan

[21] Appl. No.: 806,400

[22] Filed: Feb. 26, 1997

[30] Foreign Application Priority Data

Mar. 1, 1996 [JP] Japan ...................................... 8-45201

[51] Int. Cl.⁶ ...................................................... E05F 15/08
[52] U.S. Cl. .............................................................. 49/349
[58] Field of Search .............................. 49/348, 349, 350, 49/351, 352

[56] References Cited

U.S. PATENT DOCUMENTS

| | | | |
|---|---|---|---|
| 3,757,472 | 9/1973 | Rogakos | 49/349 X |
| 3,980,846 | 9/1976 | Yoshida | 200/61.39 |
| 4,314,692 | 2/1982 | Brauer et al. | 49/349 X |
| 4,468,063 | 8/1984 | Yukimoto et al. | |
| 4,530,185 | 7/1985 | Moriya et al. | |
| 4,659,141 | 4/1987 | Masuda et al. | 296/223 |
| 4,821,589 | 4/1989 | Fukumoto et al. | 49/349 X |
| 4,881,018 | 11/1989 | Kato et al. | 49/349 X |
| 4,920,784 | 5/1990 | Gonsior | 73/1 E |
| 5,174,425 | 12/1992 | Takahashi et al. | |
| 5,653,144 | 8/1997 | Fenelon | 49/349 X |

FOREIGN PATENT DOCUMENTS

| | | |
|---|---|---|
| 59-77933 | 5/1984 | Japan . |
| 63-47485 | 2/1988 | Japan . |
| 63-47486 | 2/1988 | Japan . |
| 6-6679 | 1/1994 | Japan . |
| 8-29114 | 2/1996 | Japan . |

*Primary Examiner*—Jerry Redman
*Attorney, Agent, or Firm*—Parkhurst & Wendel, L.L.P.

[57] ABSTRACT

A position detecting device of a moving body can detect the position of a window glass of a power window device with high precision, and can set an initial position of the window glass without making any complicated adjustment. Further, this device can be realized with a simple structure and at low cost. Furthermore, the position detecting device and the vehicle door can reliably maintain an original assembly function in a normal assembly state into the moving body. The position detecting device 30 has a pushing button 202. Rotation of a ring gear 46 can be compulsorily prevented by pushing the pushing button 202 even in an operating state of a motor. Thus, if the motor is driven by pushing the pushing button 202, the position detecting device can be reliably assembled into a vehicle body in the normal assembly state irrespective of a rotating position of a motor rotating shaft (e.g., a moving position of the window glass) so that an original function of the position detecting device can be reliably maintained.

19 Claims, 16 Drawing Sheets

DEVICE FOR DETECTING POSITION OF MOVING BODY AND VEHICLE DOOR

BACKGROUND OF THE INVENTION

1. Field of the Invention

The present invention relates to a position detecting device of a moving body and a vehicle door used in a power window device for moving a window glass of the vehicle door for opening and closing this window glass, a sunroof device for moving a sunroof for opening and closing this sunroof, etc.

2. Description of the Related Art

For example, a motor as a drive source is used for a power window device for moving a window glass of a vehicle up and down for opening and closing this window glass, and a sunroof device for moving a sunroof for opening and closing this sunroof.

Here, for example, the power window device has a so-called catch-preventing function which prevents a portion of the body of a vehicle occupant and a foreign object from being inadvertently caught between the window glass and a window frame. In the power window device having the catch-preventing function of such a kind, a limit switch is disposed at a predetermined position of the door. On the basis of signals from this limit switch and the lock electric current of the motor, a determination is made as to whether the foreign object has been caught by the window glass, and the movement of the window glass, i.e., the rotating position of the motor, is controlled appropriately. In another construction of the power window device, the rotational frequency of the armature is detected by providing a Hall IC and a special commutator. On the basis of the rotational frequency detection signal (the number of pulses and the pulse width of the pulse signal), a determination is made as to whether the foreign object is caught, and the rotational position of the motor is controlled.

However, a complicated adjustment of assembling positions of the motor and a window regulator during assembling and a complicated reset after the assembling are indispensable to such a power window device (a rotating position detecting mechanism of the motor). A drawback exists in that parts such as a controller, etc. is expensive and is imprecise when the catch-preventing mechanism must be assembled.

Therefore, the inventors of this application have proposed a position detecting device of a moving body able to solve such a drawback (e.g., Japanese Patent Application Laid-Open (JP-A) No. 8-29114).

In this proposal, the position detecting device has a planetary gear set constructed by a ring gear rotatably held by a cover plate of this device and a planetary gear engaged with this ring gear. The position detecting device also has a switch section constructed by a moving contact integrally formed on the ring gear and rotated together with the ring gear, and fixed contacts fixed to the cover plate and able to come in contact with the moving contact. Otherwise, the position detecting device has a clutch mechanism for cutting off transmission of rotating force from the moving body (a motor output shaft) to the ring gear in a forward rotating direction, etc. Thus, when the position detecting device is used in the power window device and the sunroof device, positions of the window glass and the sunroof can be detected with high precision and movements thereof can be also controlled. Further, initial positions of the window glass and the sunroof can be set without making any complicated adjustment. Furthermore, such contents can be realized at low cost and with a simple structure.

The above position detecting device of the moving body has a function capable of mechanically storing a predetermined reference position of the moving body (a function capable of automatically setting an initial position of the moving body). However, if an assembling state (procedure) into the moving body is incorrect, there is a possibility that the above original function cannot be fulfilled. Therefore, it is possible to improve such a drawback.

Namely, for example, an adjusting procedure of the position detecting device assembled in the power window device will be explained. First, the motor for driving the power window device is once sufficiently rotated in the forward rotating direction when the position detecting device is assembled into a vehicle body. When the motor has reached a predetermined rotating position (a predetermined reference position of the window glass), a state in which the rotation of the ring gear of the planetary gear set is prevented in the forward rotating direction is set. When the motor is further rotated in this state, the transmission of rotating force from the motor output shaft to the ring gear of the planetary gear set in the forward rotating direction is cut off by the clutch mechanism so that only the planetary gear is revolved. An initial state for operating the switch section, i.e., an initial state for mechanically storing the predetermined reference position of the window glass is automatically set by the above-mentioned operation.

However, if this position detecting device is assembled into the vehicle body in a state in which the motor has already reached the predetermined rotating position (in which the window glass has already reached the predetermined reference position), no motor can be sufficiently rotated after that. In other words, no state in which the rotation of the ring gear of the planetary gear set is prevented in the forward rotating direction is set although the motor has reached the predetermined rotating position (in which the window glass has reached the predetermined reference position). Therefore, there is a possibility that no initial state in which the switch section is operated (i.e., no initial state where the predetermined reference position of the window glass is mechanically stored) is set.

For example, techniques relative to the present invention are disclosed in Japanese Patent Application Laid-Open (JP-A) No. 59-77933 disclosing a sensor having a reset knob in a predetermined position of a sensor case, and Japanese Patent Application Laid-Open (JP-A) No. 63-47485 in which a free area for performing no catch-preventing control is set. The techniques relative to the present invention are also disclosed in Japanese Patent Application Laid-Open (JP-A) No. 63-47486 in which a reference position of a position detecting means is reset at a full opening end or a full closing end, and Japanese Patent Application Laid-Open (JP-A) No. 6-6679 disclosing a technique for detecting a releasing area of the catch-preventing control by a window moving sensor. The techniques relative to the present invention are also disclosed in U.S. Pat. No. 4,468,063 disclosing a technique in which a clutch is arranged between a motor shaft and a drive shaft, and the drive shaft and a switch are connected to each other through a cam. The techniques relative to the present invention are also disclosed in U.S. Pat. No. 4,530,185 disclosing a technique in which a switch device is arranged between a motor and a door lock, and an electromagnetic clutch between the motor and the switch device is operated in accordance with a position of the switch device. The techniques relative to the present invention are further disclosed in U.S. Pat. No. 5,174,425 disclosing a technique for simultaneously adjusting each of a steering angle sensor and a steering shaft to a neutral position by the operation of a clutch mechanism disconnected by a pin member of a steering angle detector for a vehicle.

SUMMARY OF THE INVENTION

In consideration of the above facts, an object of the present invention is to provide a position detecting device of a moving body such as a window glass, a sunroof, etc. in which a position of the moving body can be detected with high precision, and an initial position of the moving body can be set without making any complicated adjustment, and which can be realized at low cost and with a simple structure. The position detecting device can be reliably assembled into the moving body in a normal assembly state and an original function of the position detecting device can be reliably maintained.

Another object of the present invention is to provide a vehicle door having such a position detecting device.

The present invention resides in a position detecting device of a moving body for detecting a predetermined moving position of the moving body, comprising:

a planetary gear set which has a ring gear rotatably held by a cover plate of the position detecting device and a planetary gear engaged with the ring gear, and which is operated interlockingly with the moving body by moving force transmitted from the moving body moved in a forward direction and a reverse direction;

a switch section which has a moving contact provided integrally with the ring gear of the planetary gear set and rotated together with the ring gear and has a fixed contact fixed to the cover plate and able to come in contact with the moving contact, the switch section able to detect the predetermined moving position of the moving body by turning one of an on and an off operation of the switch section;

a clutch mechanism which usually transmits the moving force of the moving body from the planetary gear to the ring gear by preventing revolution of the planetary gear of the planetary gear set so as to rotate the ring gear, and which cuts off the transmission of a rotating force in the forward direction from the moving body to the ring gear by enabling the revolution of the planetary gear in a state in which the switch section has been operated; and an initial position setting mechanism which is provided such that the ring gear of the planetary gear set can be operated from the exterior of the cover plate, and can compulsorily prevent the rotation of the ring gear regardless of the moving position of the moving body.

In the present invention, revolution of the planetary gear of the planetary gear set is ordinarily prevented by the clutch mechanism. When the moving body is rotated in the forward and reverse directions, this moving force is transmitted to the planetary gear and the ring gear so that the ring gear is rotated in accordance with the movement of the moving body. When the moving body has reached the predetermined moving position, the moving contact rotated together with the ring gear comes in contact with the fixed contact or is separated from this fixed contact so that the switch section is operated and the predetermined moving position of the moving body is thus detected.

The planetary gear can be revolved by the clutch mechanism in the operating state of the switch section (for example, a state in which the moving contact has contacted the fixed contact). Thus, transmission of the rotating force in the forward direction from the moving body to the ring gear is cut off. Namely, after the switch section is once operated, the ring gear is not moved and the operating state of the switch section (for example, the contact state of the moving contact and the fixed contact) is maintained as it is even if the moving body is rotated in the forward direction. In other words, an initial state in which the switch section has been operated (for example, an initial state in which the moving contact has contacted the fixed contact) is automatically set by once sufficiently rotating the moving body in the forward direction.

Accordingly, for example, when this position detecting device is used in a power window device of a vehicle having a catch-preventing function and a motor for driving this power window device, the initial state in which the switch section has been operated (for example, the initial contacting state of the moving contact and the fixed contact) is automatically set by once sufficiently rotating an output shaft of the motor in the forward direction when the position detecting device is assembled into a vehicle body. Accordingly, an initial position of the moving body can be easily set without making any complicated adjustment of an assembly position in the assembly of the position detecting device and performing any complicated resetting operation after this assembly. In a construction in which a moving position of a motor rotating shaft, i.e., a window glass is detected by detecting the rotational frequency of an armature of the motor for driving the power window device by using a Hall IC, etc., a counter is indispensable to a control circuit for controlling this moving position. However, in the present invention, the position of the window glass can be exactly determined by using on/off signal only once so that no counter is required for the control circuit and cost of the position detecting device is reduced.

Further, the rotation of the ring gear of the planetary gear set can be compulsorily prevented by operating the ring gear from its exterior by the initial position setting mechanism. Therefore, if this position detecting device is assembled into the vehicle body in a state in which the moving body has already reached a predetermined reference position, the moving body is once moved in the reverse direction in a state in which the rotation of the ring gear of the planetary gear set is prevented. Thereafter, the moving body is rotated in the forward direction in a state in which the ring gear can be again rotated. Thus, the initial state for the switch section has been operated (namely, an initial state in which the predetermined reference position of the moving body has been mechanically stored) is automatically set.

Accordingly, for example, when this position detecting device is used in a power window device of a vehicle having a catch-preventing function, the initial state in which the switch section has been operated can be reliably set if the motor is driven by operating the initial position setting mechanism when the position detecting device is assembled into a vehicle body. Thus, the position detecting device can be reliably assembled into the vehicle body in a normal assembly state into the vehicle body. Accordingly, an original function of the position detecting device can be reliably maintained.

In the present invention, if the initial position setting mechanism is constructed by a ring gear pushing member for pushing the ring gear and compulsorily preventing the rotation of the ring gear, the ring gear of the planetary gear set is pushing by pushing the ring gear pushing member so that the rotation of the ring gear can be compulsorily prevented. Accordingly, the position detecting device has a simple structure and operability of the position detecting device is improved.

Further, the present invention may be applied to a vehicle door in which the position detecting device is disposed within a door inner panel and an operating hole able to operate the initial position setting mechanism is formed in the door inner panel. In this case, after the position detecting device of the moving body is assembled into the door inner panel, the initial position of the position detecting device of the moving body can be set from an outer side of the door inner panel. Namely, after the position detecting device of the moving body is assembled into the door inner panel, the rotation of the ring gear of the planetary gear set can be compulsorily prevented by operating the initial position setting mechanism from the operating hole formed in the door inner panel. Thus, the initial position of the position detecting device can be set from the outer side of the door inner panel without detaching the position detecting device of the moving body from the interior of the door inner panel. Accordingly, operability of the position detecting device is extremely improved.

DETAILED DESCRIPTION OF THE PREFERRED EMBODIMENTS (First embodiment)

Figure 1:
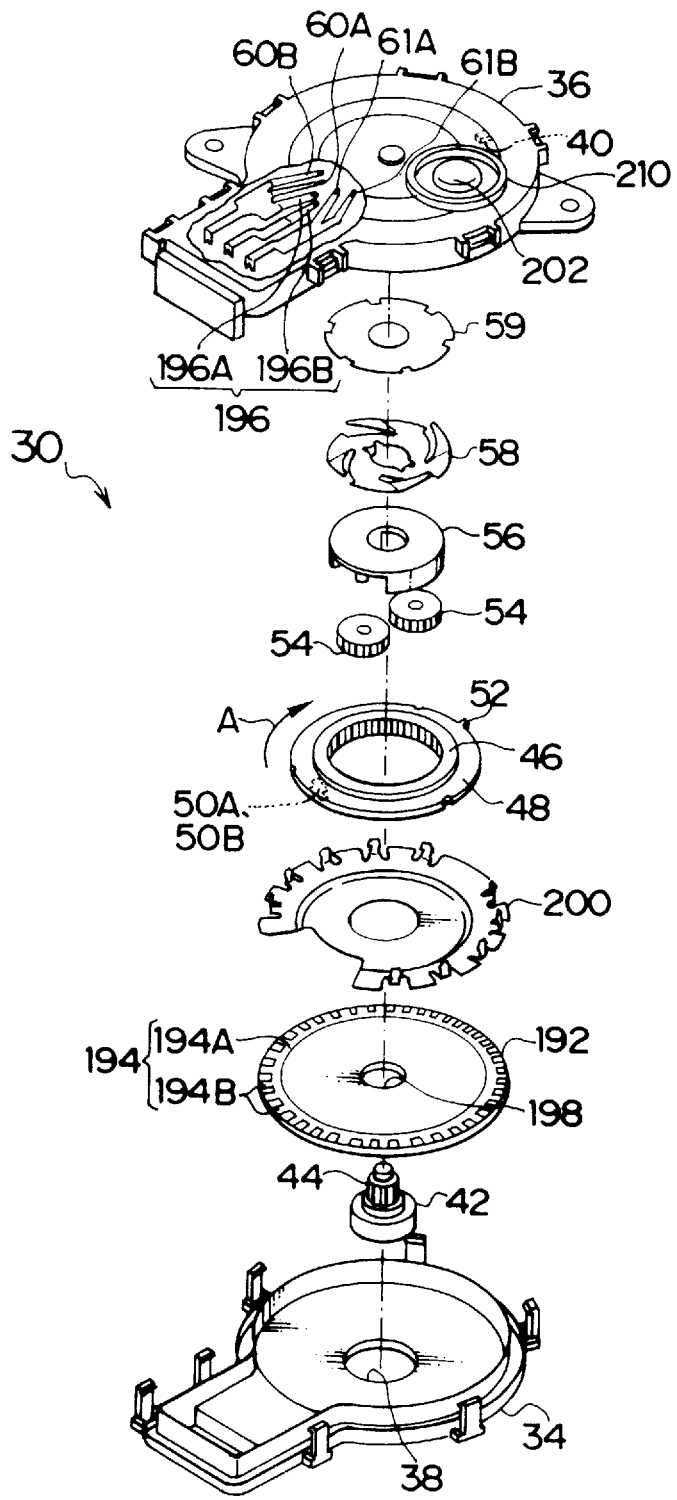
FIG. 1 is an exploded perspective view of a position detecting device in accordance with a first embodiment of the present invention.
Figure 2A:
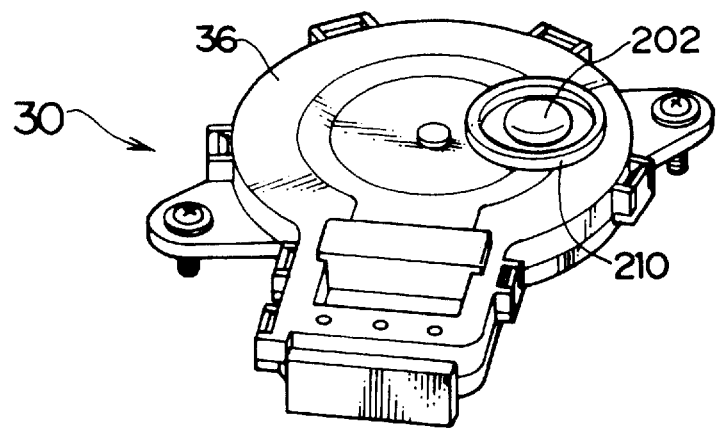
FIG. 2A is an appearance perspective view of the position detecting device in the first embodiment of the present invention.
Figure 2B:
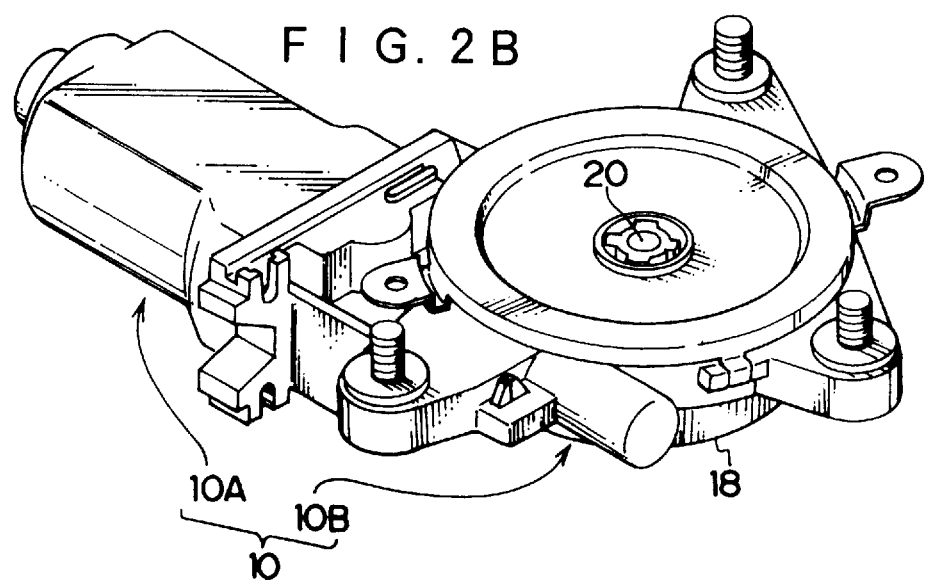
FIG. 2B is an entire perspective view of a motor for a power window device to which the position detecting device in the first embodiment of the present invention is applied.
Figure 3:
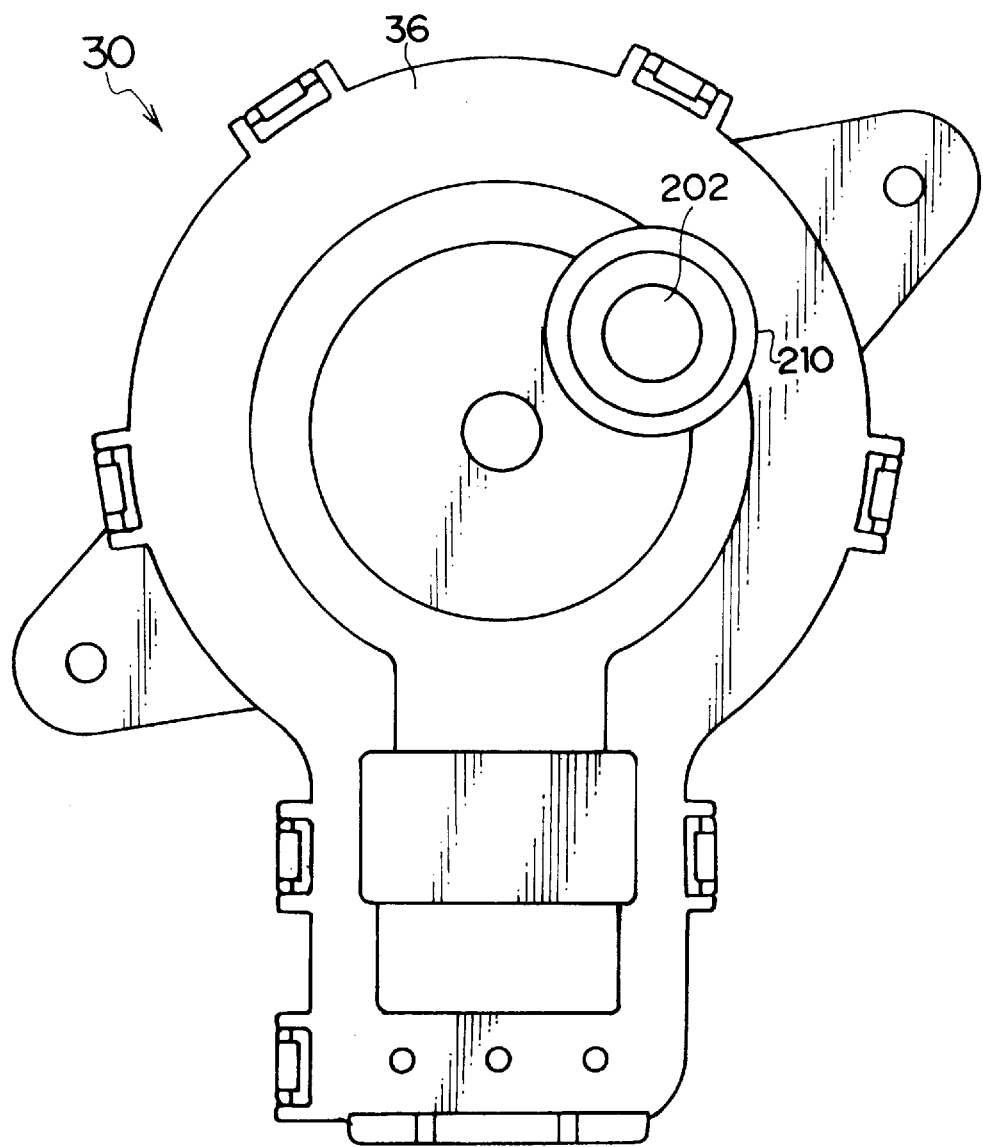
FIG. 3 is a plan view of the position detecting device in the first embodiment of the present invention.
Figure 4:
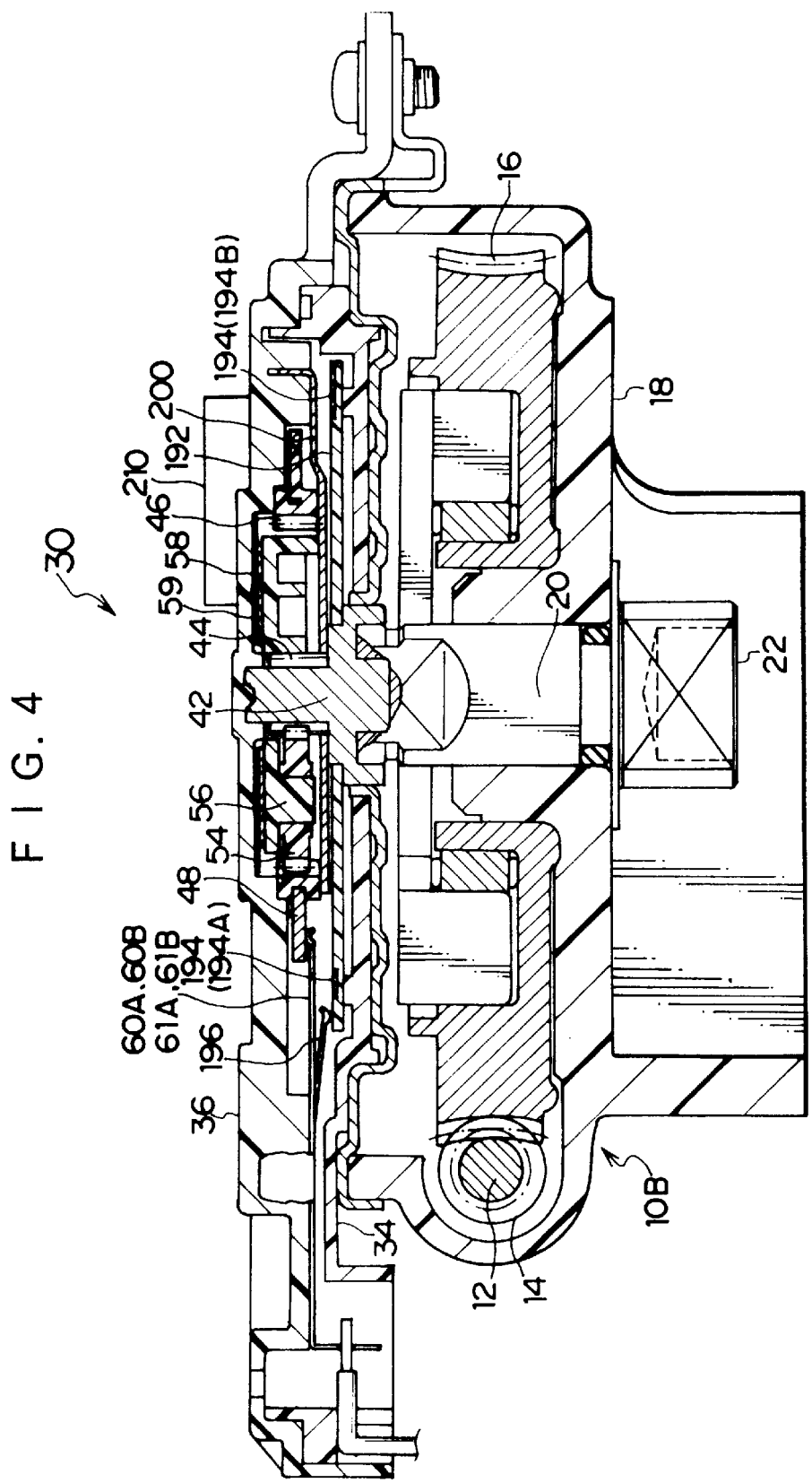
FIG. 4 is a cross-sectional view of the position detecting device in the first embodiment of the present invention and the motor for the power window device to which this position detecting device is applied.

FIG. 1 shows an exploded perspective view of a position detecting device 30 in accordance with a first embodiment of the present invention. FIG. 2 shows an entire perspective view of this position detecting device 30 and a motor 10 for a power window device to which the position detecting device 30 is applied. FIG. 3 shows a plan view of this position detecting device 30. Further, FIG. 4 shows a cross-sectional view of this position detecting device 30 and the motor 10.

The motor 10 has a motor portion 10A and a gear portion 10B connected to this motor portion 10A. A rotating shaft 12 of the motor portion 10A is extended into the gear portion 10B and a worm gear 14 is formed at an end portion of the rotating shaft 12. This worm gear 14 is engaged with a rotating gear wheel 16 housed within the gear portion 10B.

A shaft 20 of the rotating gear wheel 16 as a motor output shaft is rotatably supported by a cover 18 of the gear portion 10B. Therefore, when the motor portion 10A is actuated and the rotating shaft 12 is rotated, this rotating force is transmitted to the rotating gear wheel 16 through the worm gear 14 so that the shaft 20 is rotated. An output fitting portion 22 is formed at an end portion of the shaft 20 and is connected to an unillustrated driving portion of a window regulator. In this first embodiment, for example, a window glass is set to be moved by one stroke by rotating the shaft 20 (the output fitting portion 22) 3 to 4.5 times.

The position detecting device 30 is attached to a face opposed to the output fitting portion 22 of the gear portion 10B.

As shown in FIG. 1 in detail, the position detecting device 30 has a base plate 34 and a cover plate 36 and is approximately formed in a thin cylindrical shape by these plates. A through hole 38 is formed in a central portion of the base plate 34. A projection 40 is formed to extend in an axial direction on an inner peripheral face of the cover plate 36.

The position detecting device 30 also has a connecting shaft 42. One end of this connecting shaft 42 is integrally connected to the shaft 20 of the rotating gear wheel 16 so that the connecting shaft 42 is rotated together with the shaft 20 at any time. Further, the other end of the connecting shaft 42 is projected into the position detecting device 30 (the base plate 34 and the cover plate 36) through the through hole 38 formed in the base plate 34. A sun gear 44 constituting a planetary gear set is provided in the vicinity of the other end of the connecting shaft 42 and is engaged with a planetary gear 54 described later.

Figure 5:
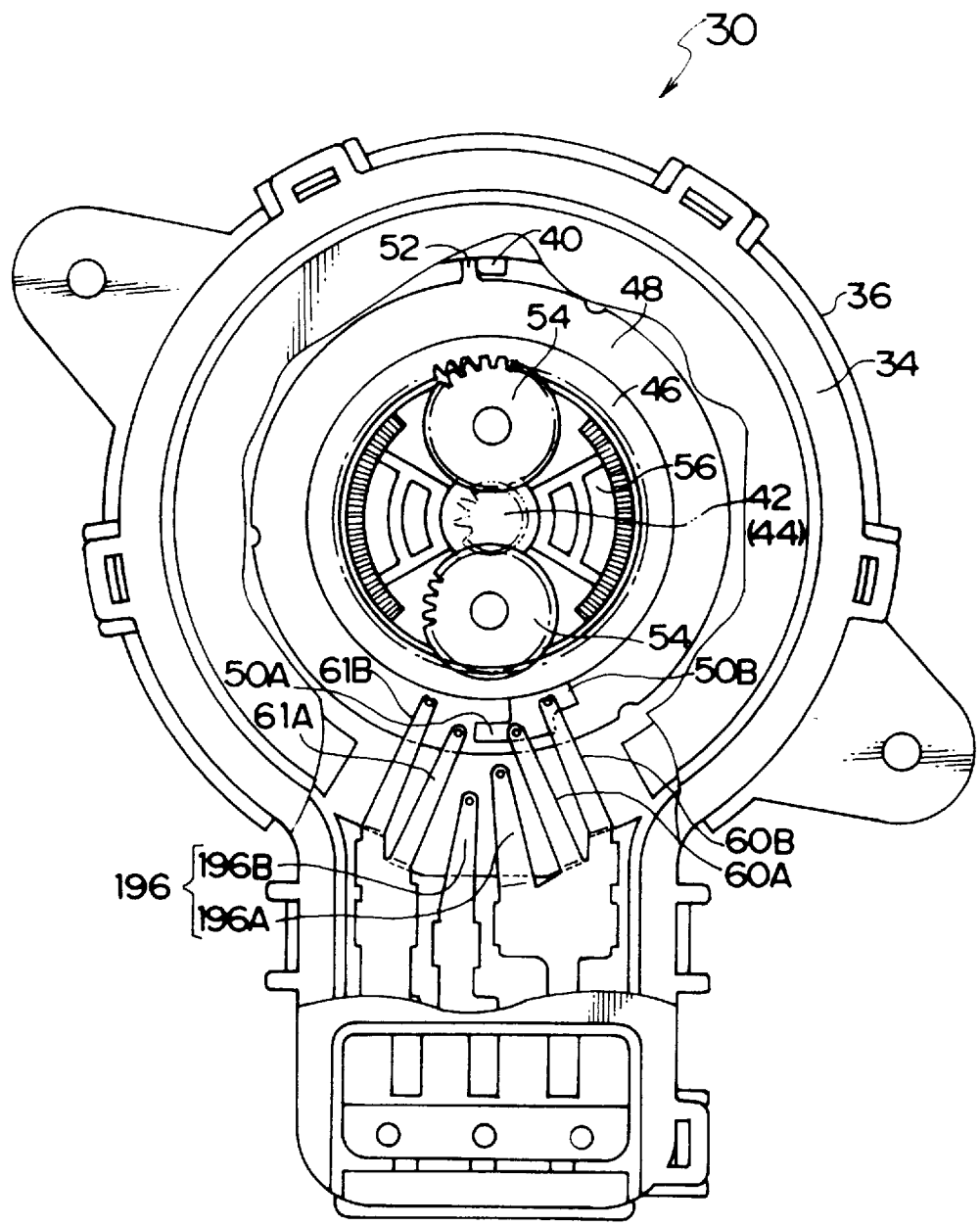
FIG. 5 is a partially broken plan view of the position detecting device in the first embodiment of the present invention.

A ring gear 46 constituting the planetary gear set is disposed around the connecting shaft 42 such that the ring gear 46 is opposed to the sun gear 44. This ring gear 46 is rotatably stored into the cover plate 36. Further, a flange portion 48 is integrally formed around the ring gear 46. The flange portion 48 is constructed by a conductive plate integrally formed on the ring gear 46. Moving contacts 50A and 50B are arranged in one peripheral face portion of the flange portion 48 on a side opposed to the cover plate 36. These moving contacts 50A and 50B are non-conductive portions formed in an arc shape at two stages and are formed such that the moving contacts 50A, 50B are approximately flushed with the flange portion 48. Further, a projection 52 is projected and formed in an peripheral edge portion of the flange portion 48. This projection 52 corresponds to the projection 40 formed in the above cover plate 36. The projection 52 comes in contact with the projection 40 (in a state shown in FIG. 5) when the ring gear 46 (the flange portion 48) is rotated in a forward rotating direction (the direction of an arrow A in FIG. 1) and reaches a predetermined rotating position. Thus, further rotation of the ring gear 46 in the forward rotating direction is prevented.

Two planetary gears 54 are disposed between the inner peripheral portion of the ring gear 46 and the sun gear 44. These planetary gears 54 are rotatably supported by a carrier 56 and are engaged with the ring gear 46 and the sun gear 44. Namely, the sun gear 44, the ring gear 46 and the planetary gears 54 constitute a planetary gear set. Rotation of the connecting shaft 42 (namely, the shaft 20) can be reduced in speed and transmitted by this planetary gear set. For example, the rotation of the connecting shaft 42 (namely, the shaft 20) can be reduced in speed and transmitted to the ring gear 46 in a state in which the carrier 56 is held and revolution of each of the planetary gears 54 is prevented.

In this first embodiment, a reduction ratio of the planetary gear set constructed by the sun gear 44, the ring gear 46 and the planetary gears 54 is set to 5.2:1. During one stroke of the window glass (i.e., during the time the sun gear 44 rotates 3 to 4.5 times), the ring gear 46 rotates less than one complete rotation at all of the window glasses.

The reduction ratio of the planetary gear set is not limited to 5.2:1, but can be set to an arbitrary ratio as desired.

The above planetary gear set constructed by the sun gear 44, the ring gear 46 and the planetary gears 54 is covered with the cover plate 36 and is held by a protective plate 200 so that dropping-off of the planetary gear set from the cover plate 36 is prevented. A washer 59 and a spring washer 58 constituting a clutch mechanism are disposed between the cover plate 36 and the carrier 56. The spring washer 58 is integrally attached to the carrier 56. The washer 59 is integrally press-fitted into an inner peripheral surface of the cover plate 36. The spring washer 58 abuts this washer 59 in a compressed state. Thus, the spring washer 58 always pushes the carrier 56 and the carrier 56 abuts the protective plate 200. Therefore, rotation of the carrier 56 is usually prevented by pushing force of the spring washer 58 (frictional force between the carrier 56 and the protective plate 200, and frictional force between the spring washer 58 and the washer 59). Accordingly, the planetary gears 54 are held in a state in which the revolution of each of the planetary gears 54 is prevented. In contrast to this, in a state in which the projection 52 of the flange portion 48 of the ring gear 46 abuts the projection 40 and further rotation of the ring gear 46 in the forward rotating direction is prevented, the spring washer 58 releases holding of the carrier 56 by application of rotating force of the sun gear 44 in the forward rotating direction exceeding pushing force (holding force) of the carrier 56 so that the planetary gears 54 can be revolved. Namely, after the projection 52 of the flange portion 48 abuts the projection 40, the spring washer 58 can cut off transmission of the rotating force in the forward rotating direction from the sun gear 44 (the shaft 20) to the ring gear 46. Accordingly, when the sun gear 44 (the shaft 20) is rotated in the forward rotating direction (a direction for rotating the ring gear 46 in the forward rotating direction), only the planetary gears 54 are revolved in a state in which the projection 52 abuts the projection 40 and the rotation of the ring gear 46 is prevented.

Two fixed contact pair sets composed of a pair of fixed contacts 60A, 61A and a pair of fixed contacts 60B, 61B are attached to the cover plate 36. The fixed contacts 60A, 61A and the fixed contacts 60B, 61B are constructed by two pair sets of contact plates having elasticity. The fixed contacts 60A and 60B are integrally formed, and the fixed contacts 61A and 61B are integrally formed. One end (proximal end) of each of the fixed contacts 60A, 61A and the fixed contacts 60B, 61B is fixed to the cover plate 36. An distal end of each of the fixed contacts 60A, 61A and the fixed contacts 60B, 61B is extended toward the flange portion 48 of the ring gear 46. The distal end of each of the fixed contacts 60A, 61A and the fixed contacts 60B, 61B elastically abuts the flange portion 48 (a peripheral surface of the flange portion 48 on a side opposed to the cover plate 36). Namely, the fixed contacts 60A, 61A and the fixed contacts 60B, 61B press-contact the flange portion 48 (the moving contacts 50A, 50B) of the ring gear 46 from the side opposed to the cover plate 36.

The fixed contacts 60A, 61A and the fixed contacts 60B, 61B come in contact with the moving contacts 50A, 50B in predetermined rotating positions of the ring gear 46. The fixed contacts 60A, 61A correspond to the moving contact 50A, and the fixed contacts 60B, 61B correspond to the moving contact 50B.

Further, the fixed contacts 60A, 61A and the fixed contacts 60B, 61B are electrically connected to a control circuit of the power window device. The moving contacts 50A, 50B come in contact with the fixed contacts 60A, 60B so that a non-conductive state is set. Thus, a rotating position of the ring gear 46, i.e., a rotating position of the sun gear 44, or, a rotating position of the shaft 20 can be detected. This construction is used to control rotation of the motor 10 explained later.

In this first embodiment, the dimensions of the portions are set such that, for example, at the point in time when a window glass reaches a position which is 4 mm lower than the top position, the projection 52 reaches an upstream side position at a predetermined angle of rotation from the position at which the projection 52 abuts the projection 40, and further, at this point in time, the moving contacts 50A, 50B come in contact with the fixed contacts 60A, 60B such that there is a non-conductive state, and thereafter, the non-conductive state is maintained until the projection 52 comes in contact with the projection 40.

Also, the position of the moving body may be detected by the following structure which is a reverse case of the above structure: at the point in time when the window glass reaches a position 4 mm beneath the top edge stop position and the projection 52 reaches a position upstream, by a predetermined rotating angle, from the position at which of the projection 52 abuts the projection 40, the moving contacts 50A, 50B contact the fixed contacts 60A, 61A and the fixed contacts 60B, 61B, and are in a conductive state. Moreover, it is not absolutely necessary to, after the non-conductive state or conductive state has been attained, electrically maintain this non-conductive state or conductive state as in the above-described structure. It can be determined that the predetermined rotation position has been reached by detecting a trigger signal which is outputted by the moving contacts 50A, 50B contacting the fixed contacts 60A, 61A and the fixed contacts 60B, 61B.

The position detecting device 30 has a pulse plate 192 serving as a pulse generating means and a sliding contact 196 serving as a pulse detecting means.

The pulse plate 192 is formed in a thin disk shape. The connecting shaft 42 is press-fitted into a fitting hole 198 formed in a central portion of the pulse plate 192 so that the pulse plate 192 and the connecting shaft 42 are integrally fixed to each other. Accordingly, the pulse plate 192 is rotated integrally with the connecting shaft 42 at any time. A conductive portion 194 is formed in the pulse plate 192. The conductive portion 194 is formed along a peripheral edge of the pulse plate 192 in its peripheral direction. The conductive portion 194 is constructed by a first conductive portion 194A formed in a ring shape and a second conductive portion 194B adjacent to this first conductive portion 194A and having a series of pulse-shaped concave and convex portions.

In contrast to this, a base portion of the sliding contact 196 is fixed to the cover plate 36 and is extended toward the conductive portion 194 of the pulse plate 192. The sliding contact 196 is constructed by an input contact 196A, which always contacts the first conductive portion 194A of the conductive portion 194 and an output contact 196B, which contacts the second conductive portion 194B of the conductive portion 194. Thus, a pulse signal can be detected by rotating the pulse plate 192. This detected pulse signal is used to control a moving position of the moving body (window glass).

The conductive portion 194 is not formed on an upper surface of the pulse plate 192, but may be formed in the peripheral side wall of the pulse plate 192. In this case, the sliding contact 196 is opposed to the peripheral side wall of the pulse plate 192 and is fixed to the cover plate 36.

Further, the above protective plate 200 is disposed between the pulse plate 192 and the ring gear 46 (flange portion 48). A peripheral edge portion of this protective plate 200 is fixedly held by the cover plate 36. The protective plate 200 holds the ring gear 46, the carrier 56, etc. to prevent the ring gear 46, the carrier 56, etc. from dropping-off from the cover plate 36. The protective plate 200 is interposed between the pulse plate 192 and the ring gear 46 (flange portion 48) to limit their movements such that the pulse plate 192 and the ring gear 46 (flange portion 48) do not unnecessarily come in contact with each other.

Figure 6:
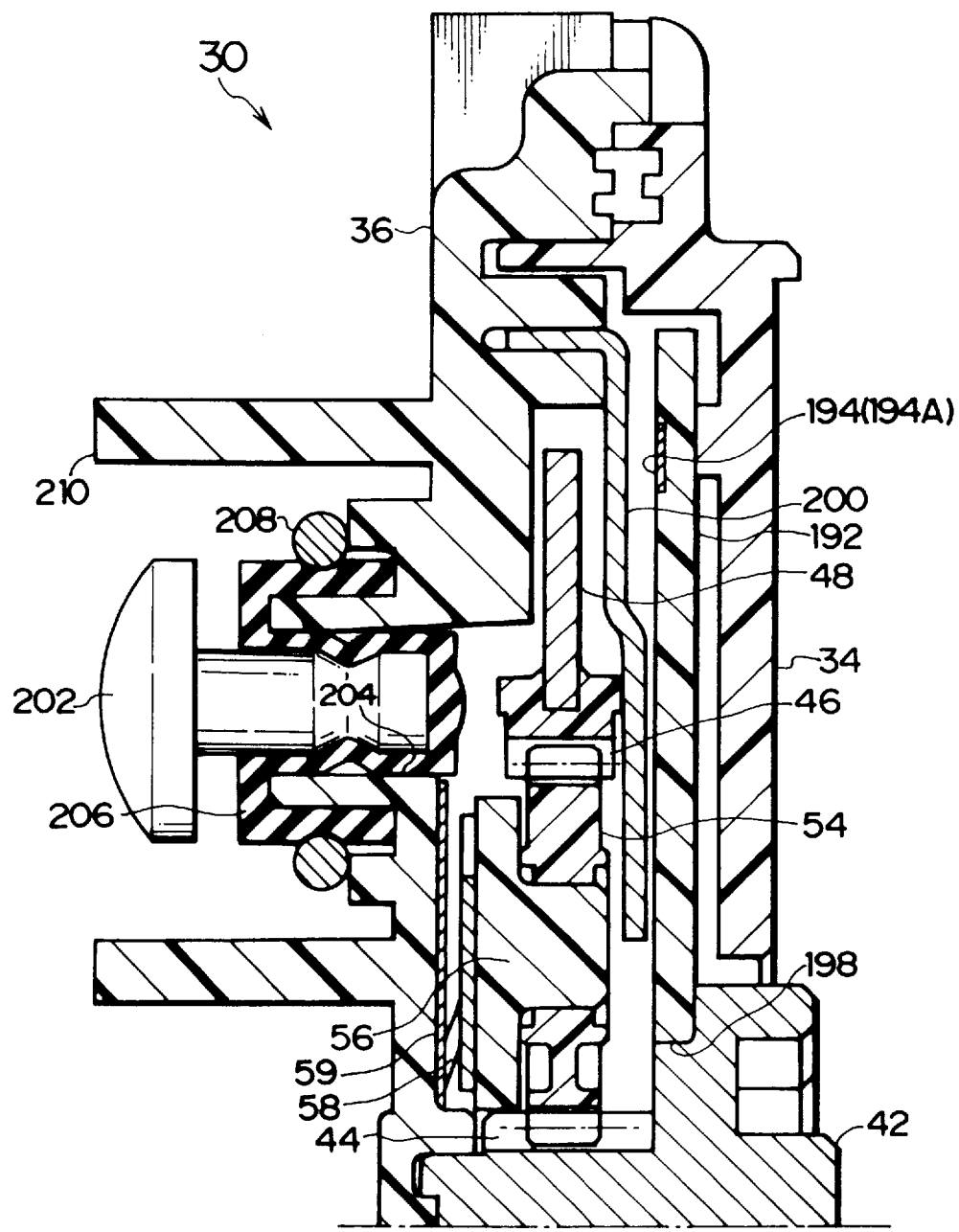
FIG. 6 is an enlarged sectional view showing a pushing button of the position detecting device in the first embodiment of the present invention.

Furthermore, the position detecting device 30 has a pushing button 202 serving as an initial position setting mechanism. As shown in FIG. 6 in detail, the pushing button 202 is held in a retaining hole 204 of the cover plate 36 through a rubber 206 and is arranged such that the pushing button 202 is opposed to the ring gear 46. Therefore, the pushing button 202 (rubber 206) is pushed against the ring gear 46 from its exterior so that rotation of the ring gear 46 can be compulsorily prevented.

A retaining spring 208 is wound around the rubber 206 for sealing. Further, a protective wall 210 is formed integrally with the cover plate 36 so as to surround the pushing button 202. The tope of the protective wall 210 is positioned at a slightly projected position from the top of the pushing button 202 in an ordinary state (a non-operating state) so as to prevent a careless operation of the pushing button 202.

Figure 7:
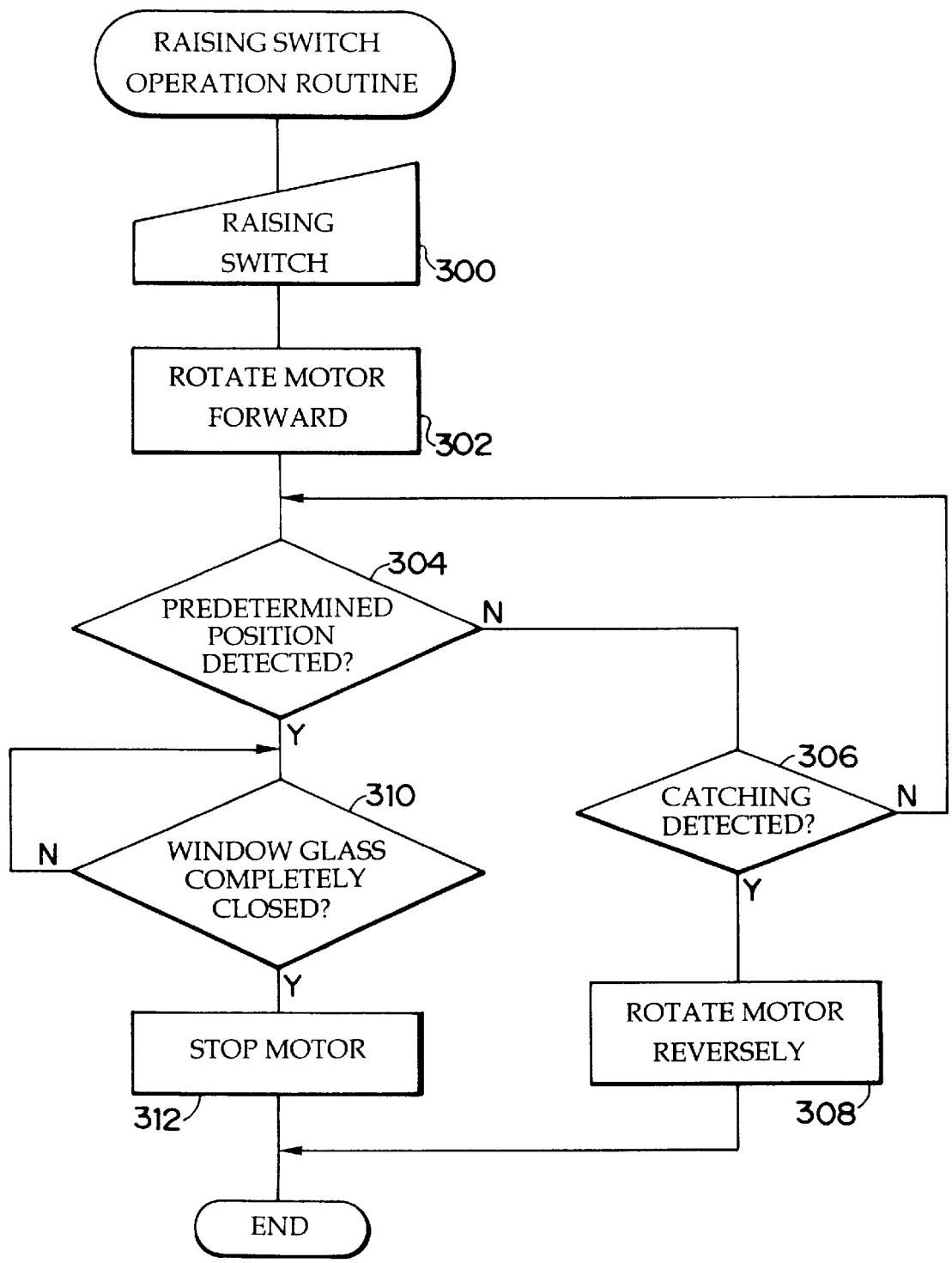
FIG. 7 is a flow chart showing control of a window glass when the window glass is moved upward by operating a raising switch of the power window device to which the position detecting device in the first embodiment of the present invention is applied.

An operation of the position detecting device in this first embodiment will next be explained with reference to the flow chart of FIG. 7 when a raising switch of the power window device is operated and the window glass is moved upward as an example.

With respect to the above motor 10 and the position detecting device 30, when the raising switch of the power window device is operated in step 300, the motor 10 is driven in step 302 so that the shaft 20 is rotated. Thus, a window regulator is operated so that the window glass is raised.

Here, the carrier 56 is ordinarily pushed to be held by the spring washer 58 (while the window glass is raised) so that revolution of each of the planetary gears 54 is prevented. Accordingly, rotating force of the connecting shaft 42 (i.e., the sun gear 44) is reduced in speed through the planetary gears 54 to be transmitted to the ring gear 46 as the shaft 20 is rotated. Thus, the ring gear 46 is gradually rotated in the forward rotating direction.

Next, in step 304, the position detecting device 30 detects whether or not the motor 10 reaches a predetermined rotating position, i.e., the window glass has reached the predetermined position (a position separated by 4 mm downward from an upper end stopping position).

Namely, with respect to the position detecting device 30, the rotating force of the connecting shaft 42 (i.e., the sun gear 44) is reduced in speed to be transmitted to the ring gear 46 through the planetary gears 54 in accordance with the rotation of the shaft 20. Thus, the ring gear 46 is gradually rotated in the forward rotating direction. However, if the window glass has not reached the position separated by 4 mm downward from the upper end stopping position, the projection 52 is largely separated from the projection 40 and the moving contacts 50A, 50B are separated from the fixed contacts 60A, 61A and the fixed contacts 60B, 61B and are in a non-contact state. Thus, a rotating position of the shaft 20 is detected (namely, it is detected that the window glass has not reached the position separated by 4 mm downward from the upper end stopping position). In this case, the routine proceeds to step 306 while the motor 10 is continuously driven. In this step 306, it is determined on the basis of a locking electric current of the motor 10, etc. as to whether a foreign object is caught or not. When it is detected that the foreign object has been caught, the motor 10 is rotated in a reverse rotating direction in step 308 so that the window glass is lowered. In contrast to this, when no catch of the foreign object is detected in the step 306, it is again returned to the step 304.

In the step 304, when the window glass has reached the position separated by 4 mm downward from the upper end stopping position, the projection 52 reaches a position on an upstream side at a predetermined rotating angle from a position where the projection 52 contacts the projection 40. Further, at this time point, the moving contacts 50A, 50B come in contact with the fixed contacts 60A, 60B and attain a non-conductive state. Thus, the rotating position of the shaft 20 is detected (namely, it is detected that the window glass has reached the position separated by 4 mm downward from the upper end stopping position).

When it is detected in the step 304 that the shaft 20 of the motor 10 has reached a predetermined rotating position, i.e., the window glass has reached a predetermined position, the routine proceeds to step 310 while the motor 10 is continuously driven. In this case, relative contact positions of the moving contacts 50A, 50B, to the fixed contacts 60A, 60B and the fixed contacts 61A, 61B are changed as the ring gear 46 is rotated, but the non-conductive state is maintained.

In the step 310, it is determined on the basis of a change in pulse signal generated from the conductive portion 194 and the sliding contact 196 by rotating the pulse plate 192 as to the window glass is completely closed or not. When it is detected that the window glass has been completely closed, the motor 10 is stopped in step 312 and the routine terminates.

Thus, in the position detecting device 30, the rotating position of the shaft 20, i.e., the position of the window glass, can be detected (it is detected whether or not the window glass has reached the position separated by 4 mm downward from the upper end stopping position) with high precision by the moving contacts 50A, 50B rotated together with the ring gear 46, and the fixed contacts 60A, 61A and the fixed contacts 60B, 61B as two fixed contact pair sets.

Further, the position detecting device 30 can automatically set in an initial state in which the moving contacts 50A, 50B come in contact with the fixed contacts 60A, 60B by once sufficiently rotating the shaft 20 of the motor 10 in the forward rotating direction when the position detecting device 30 has been assembled into a vehicle body.

Namely, when the shaft 20 of the motor 10 is once sufficiently rotated in the forward rotating direction after the position detecting device has been mounted on the vehicle body, the projection 52 of the flange portion 48 of the ring gear 46 first comes in contact with the projection 40 so that a state for preventing a further rotation of the ring gear 46 in the forward rotating direction is set. When the shaft 20 is further rotated in this state, rotating force of the sun gear 44 exceeding pushing force (holding force) of the carrier 56 is provided. Thus, the spring washer 58 releases the carrier 56 and the planetary gears 54 can be revolved. Namely, after the projection 52 of the flange portion 48 comes in contact with the projection 40, the spring washer 58 can cut off transmission of the rotating force in the forward rotating direction from the sun gear 44 (shaft 20) to the ring gear 46. Therefore, only the planetary gears 54 are revolved in a state in which the projection 52 comes in contact with the projection 40 and the rotation of the ring gear 46 is prevented when the sun gear 44 (shaft 20) is rotated in the forward rotating direction (a direction for rotating the ring gear 46 in the forward rotating direction). Accordingly, after the projection 52 comes in contact with the projection 40 and the moving contacts 50A, SOB come in contact with the fixed contacts 60A, 60B, no ring gear 46 is moved and contact states of the moving contacts 50A, 50B and the fixed contacts 60A, 60B are maintained as they are even if the shaft 20 of the motor 10 is rotated in the forward rotating direction. Namely, an initial state for making the projection 52 come in contact with the projection 40 and making the moving contacts 50A, 50B come in contact with the fixed contacts 60A, 60B is automatically set by once sufficiently rotating the shaft 20 of the motor 10 in the forward rotating direction.

In other words, the position detecting device 30 can mechanically store a position separated by a predetermined distance (4 mm in the first embodiment) from a complete closing position (an upper maximum moving limit) of the window glass regardless of whether or not the window glass has reached the completely closed position (the upper maximum moving limit). (In this case, the moving position of the window glass is detected with the position separated by 4 mm as a reference). Therefore, the movement of the window glass can be reliably controlled without any error. For example, in the conventional construction in which the moving position of the window glass is detected by detecting the rotational frequency of an armature of the motor, resetting is carried out on the basis of the completely closed position of the window glass. However, if the window glass was stopped when it had not yet reached the actual upper maximum moving limit due to a drop in the power source voltage or an increase in the frictional resistance between the window glass and the window frame, etc., resetting would be performed with this unauthentic stop position of the window glass as the completely closed position of the window glass. Accordingly, in this case, because control of the driving of the motor would be effected on the basis of this unauthentic completely closed position of the window glass, the error would be quite great. In contrast, even when the window glass is stopped without reaching the actual completely closed position (the upper maximum moving limit), the position detecting device 30 reliably detects the position separated by 4 mm from the actual completely closed position when the window glass passes through this position separated by 4 mm after the stoppage. Accordingly, the movement of the window glass can be reliably controlled without any error. In particular, an error in control of the moving position of the window glass by looseness of wire is large in a window regulator device of a wire type. However, this error caused by the looseness of wire can be absorbed by using the position detecting device 30 so that the moving position of the window glass can be controlled with high precision.

Thus, in the position detecting device 30, by rotating the shaft 20 of the motor 10 sufficiently in the forward direction at the time of assembly into the vehicle body, the initial state, in which the projection 52 abuts the projection 40 and the moving contacts 50A, 50B contact the fixed contacts 60A, 60B is automatically set. Accordingly, an initial position of the window glass can be easily set without making any complicated adjustment of an assembly position in the assembly of the position detecting device and performing any complicated resetting operation after the assembly. Further, the movement of the window glass can be reliably controlled without any error.

In the position detecting device 30 in this first embodiment, a pulse signal is detected by repeating contact/non-contact of the output contact 196B and the second conductive portion 194B of the conductive portion 194 as the pulse plate 192 is rotated. Therefore, a rotating speed of the shaft 20 of the motor 10 can be linearly detected on the basis of this detected pulse signal.

Accordingly, for example, when this position detecting device 30 is used in the power window device of a vehicle having a catch-preventing function, a predetermined position and a moving speed of the window glass can be linearly detected and controlled at any time.

Furthermore, the position detecting device 30 can compulsorily prevent the rotation of the ring gear 46 by pushing the pushing button 202 from its exterior. Therefore, the initial position of the window glass can be easily set even when the position detecting device 30 is assembled in states in which the window glass has already reached the completely closed position (the upper maximum moving limit) and it is separated by a predetermined distance (4 mm in this first embodiment) from the completely closed position.

Namely, in these cases, the shaft 20 of the motor 10 is once rotated in the reverse rotating direction (a lowering direction of the window glass) and the window glass is once set to an opening state in a state in which the rotation of the ring gear 46 is prevented by operating the pushing button 202. At this time point, the projection 52 is separated from the projection 40 and the moving contacts 50A, 50B are separated from the fixed contacts 60A, 61A and the fixed contacts 60B, 61B so that a non-contact state is set. Further, if the shaft 20 of the motor 10 is rotated in the forward rotating direction (a raising direction of the window glass) in a state in which the pushing button 202 is then released and the ring gear 46 can be again rotated, similar to the above case, an initial state as a non-conductive state set by making the moving contacts 50A, 50B come in contact with the fixed contacts 60A, 60B is automatically set. (Namely, an initial state for mechanically storing the position of the window glass separated by 4 mm downward from the upper end stopping position is automatically set.) Thereafter, similar to the above case, the projection 52 comes in contact with the projection 40 and the clutch mechanism is operated.

Thus, the initial state in which the projection 52 contacts the projection 40 and the moving contacts 50A, 50B contact the fixed contacts 60A, 60B can be reliably set if the motor 10 is driven by operating the pushing button 202 in the assembly of the position detecting device 30 into a vehicle body. Namely, the position detecting device can be reliably assembled into the vehicle body in a normal assembly state regardless of the rotating position (the moving position of the window glass) of the shaft 20 of the motor 10 so that an original function of the position detecting device can be reliably maintained.

Further, the protective wall 210 is positioned so as to surround the pushing button 202 so that a careless operation of the pushing button 202 is prevented.

(Second embodiment)

Another embodiment of the present invention will next be explained. The same parts or members as the above-mentioned first embodiment are basically designated by the same reference numerals as the first embodiment, and an explanation thereof is omitted in the following description.

Figure 8:
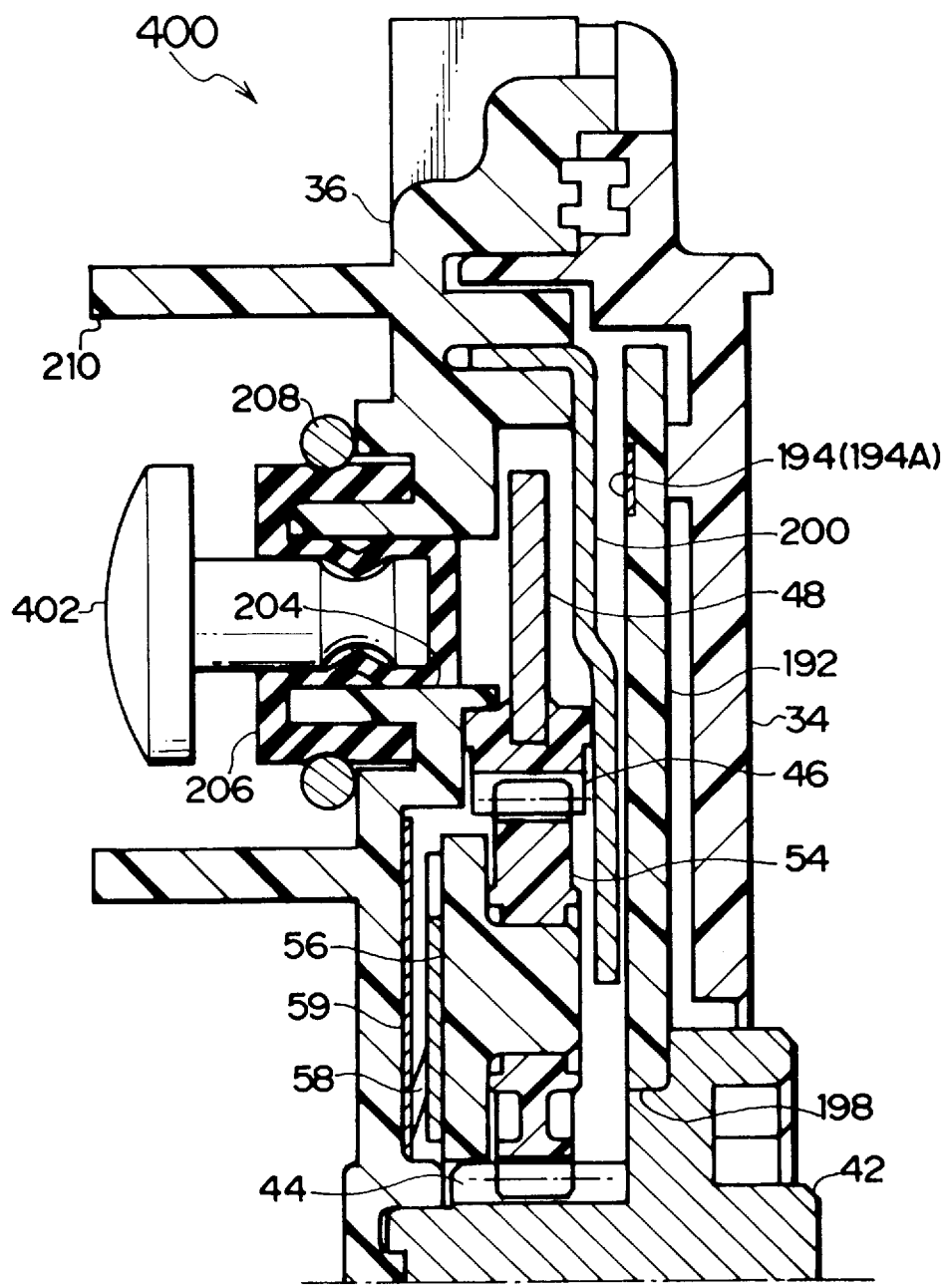
FIG. 8 is an enlarged sectional view of a main portion of a position detecting device in accordance with a second embodiment of the present invention.

FIG. 8 shows an enlarged sectional view of a main portion of a position detecting device 400 in accordance with a second embodiment of the present invention.

The position detecting device 400 has a pushing button 402. The pushing button 402 is basically the same as the pushing button 202 in the above-mentioned first embodiment. However, the pushing button 402 is disposed in a position opposed to the flange portion 48 of the ring gear 46. The flange portion 48 is pushed by pushing the pushing button 402 so that rotation of the ring gear 46 can be prevented.

In this position detecting device 400, an initial state in which the projection 52 comes in contact with the projection 40 and moving contacts 50A, 50B come in contact with the fixed contacts 60A, 60B can be also reliably set if the motor 10 is driven by pushing the pushing button 402 when the position detecting device is assembled into a vehicle body. Thus, the position detecting device can be reliably assembled into the vehicle body in a normal assembly state irrespective of the rotating position (the moving position of a window glass) of the shaft 20 of the motor 10. Accordingly, an original function of the position detecting device can be reliably maintained.

(Third embodiment)

Figure 9:
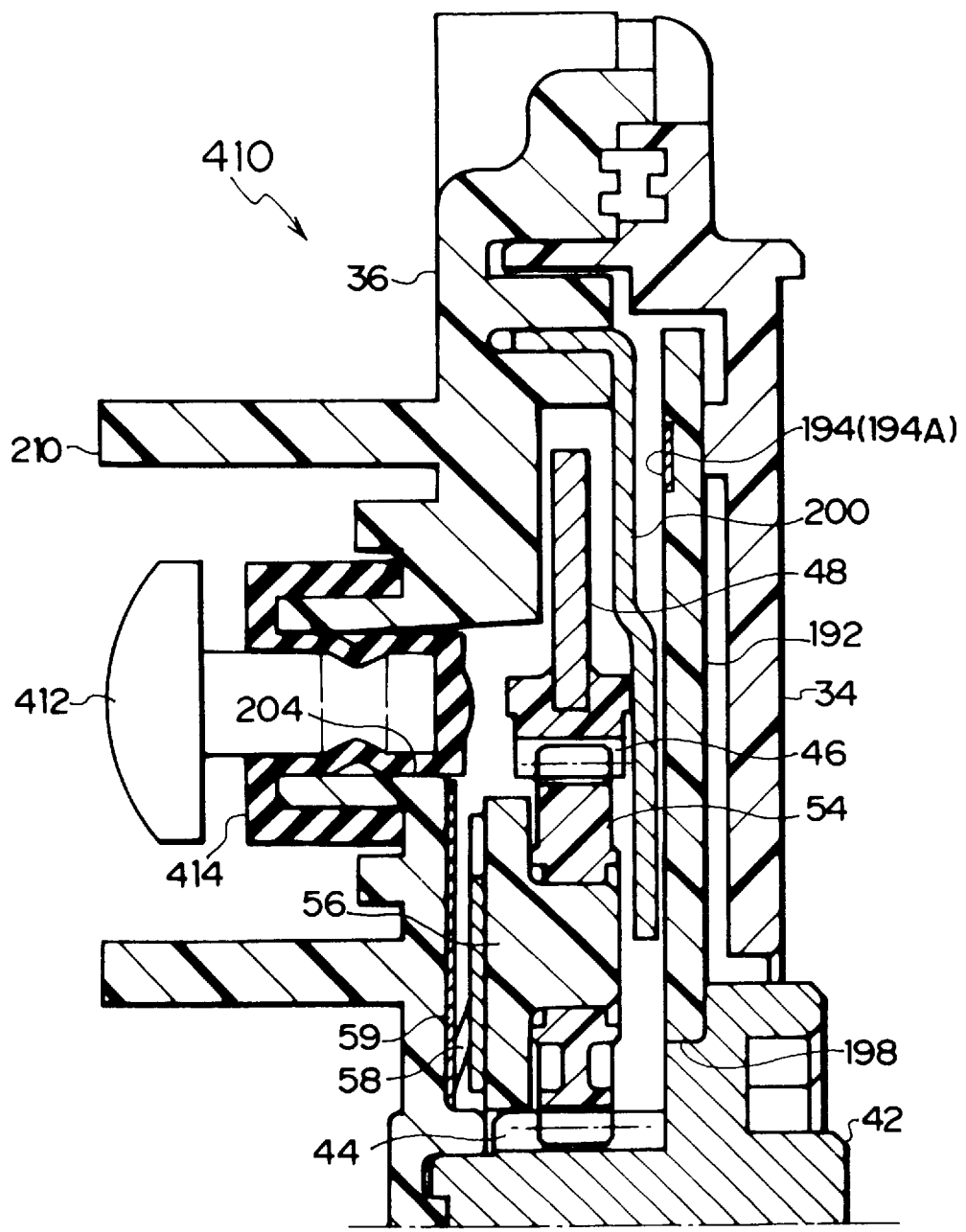
FIG. 9 is an enlarged sectional view of a main portion of a position detecting device in accordance with a third embodiment of the present invention.

FIG. 9 shows an enlarged sectional view of a main portion of a position detecting device 410 in accordance with a third embodiment of the present invention.

The position detecting device 410 has a pushing button 412. The pushing button 412 is basically the same as the above-mentioned pushing button 202. The pushing button 412 is held in a holding hole 204 through a rubber 414 in a position opposed to the ring gear 46. The rubber 414 is fixed to a peripheral portion of the holding hole 204 by adhesive. Therefore, the above-mentioned holding spring 208 is not provided in this construction.

This position detecting device 410 can be reliably assembled into the vehicle body in a normal assembly state irrespective of the rotating position (the moving position of a window glass) of the shaft 20 of the motor 10 if the motor 10 is operated by pushing the pushing button 412 in the assembly of the position detecting device into the vehicle body. Accordingly, an original function of the position detecting device can be reliably maintained.

(Fourth embodiment)

Figure 10:
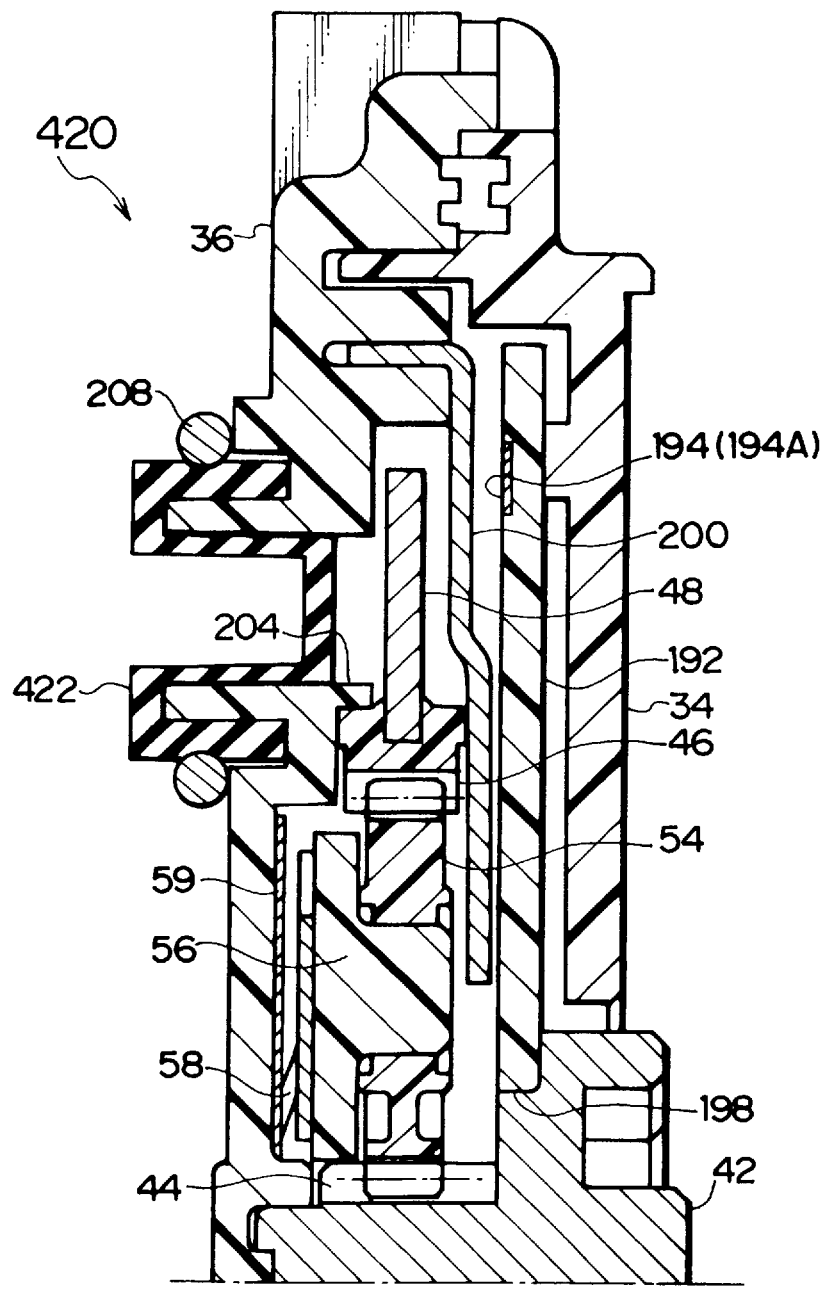
FIG. 10 is an enlarged sectional view of a main portion of a position detecting device in accordance with a fourth embodiment of the present invention.

FIG. 10 shows an enlarged sectional view of a main portion of a position detecting device 420 in accordance with a fourth embodiment of the present invention.

The position detecting device 420 basically has a structure similar to that of the position detecting device 400 in the second embodiment. However, the pushing button 402 shown in FIG. 9 is not provided. A holding hole 204 and a rubber 422 are disposed in positions opposed to the flange portion 48 of the ring gear 46. In this position detecting device 420, the rubber 422 is pushed from its exterior by a jig so that the flange portion 48 is pushed and rotation of the ring gear 46 can be prevented.

The position detecting device 420 can be also reliably assembled into a vehicle body in a normal assembly state irrespective of the rotating position of the shaft 20 (the moving position of a window glass) of the motor 10 if the motor 10 is driven by pushing the rubber 422 from its exterior by the jig in the assembly of the position detecting device into the vehicle body.

(Fifth embodiment)

Figure 11:
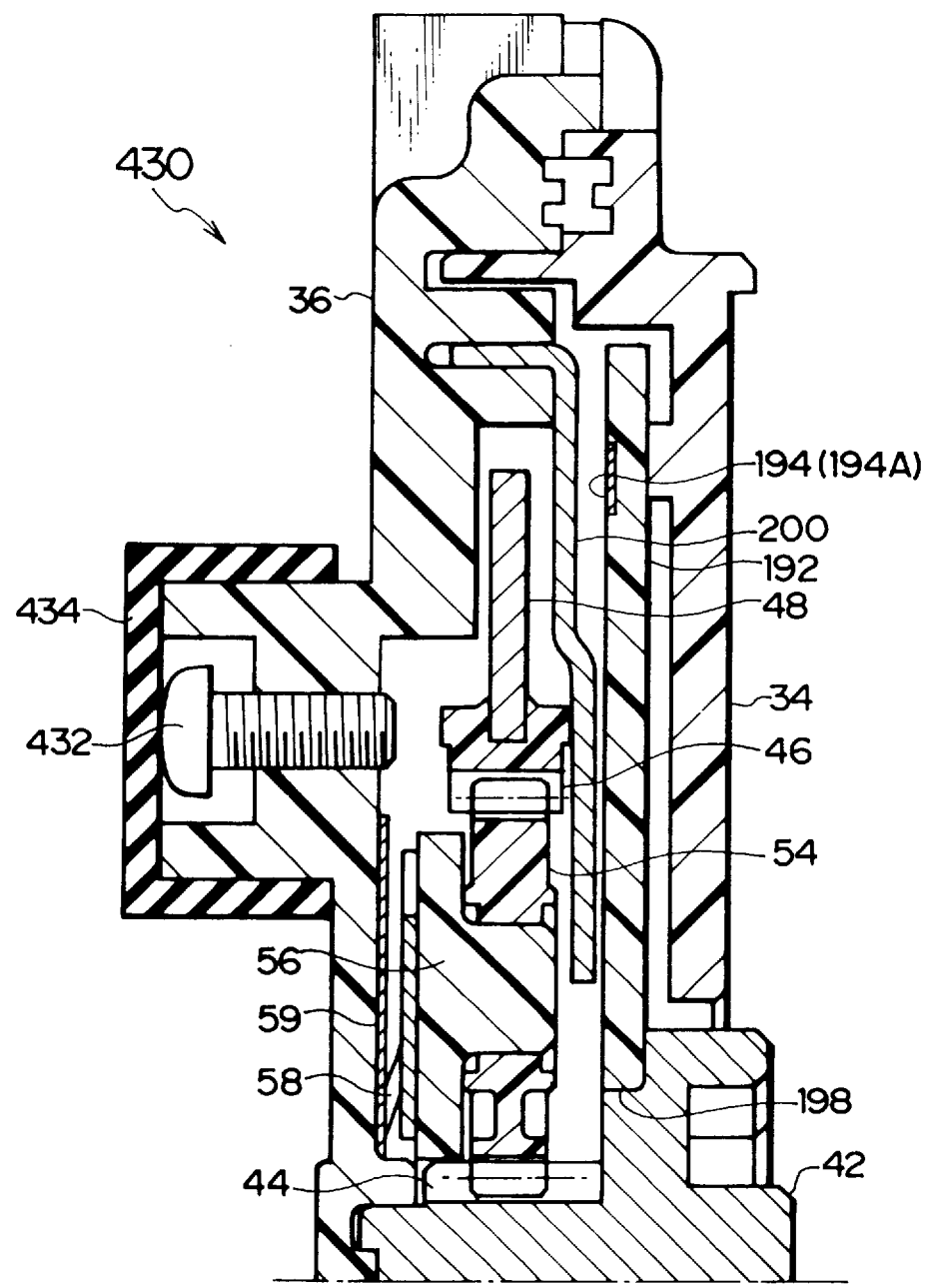
FIG. 11 is an enlarged sectional view of a main portion of a position detecting device in accordance with a fifth embodiment of the present invention.

FIG. 11 shows an enlarged sectional view of a main portion of a position detecting device 430 in accordance with a fifth embodiment of the present invention.

The position detecting device 430 has a pushing screw 432 serving as an initial position setting mechanism. Similar to the above pushing button 202, the pushing screw 432 is disposed in a position opposed to the ring gear 46. The ring gear 46 is pushed by screwing the pushing screw 432 so that rotation of the ring gear 46 can be prevented. Further, a rubber 434 is disposed around the pushing screw 432. The pushing screw 432 for is covered with the rubber 434 for sealing.

The position detecting device 430 can be also reliably assembled into a vehicle body in a normal assembly state irrespective of the rotating position of the shaft 20 (the moving position of a window glass) of the motor 10 if the motor 10 is driven by screwing the pushing screw 432 in the assembly of the position detecting device into the vehicle body.

(Sixth embodiment)

Figure 12:
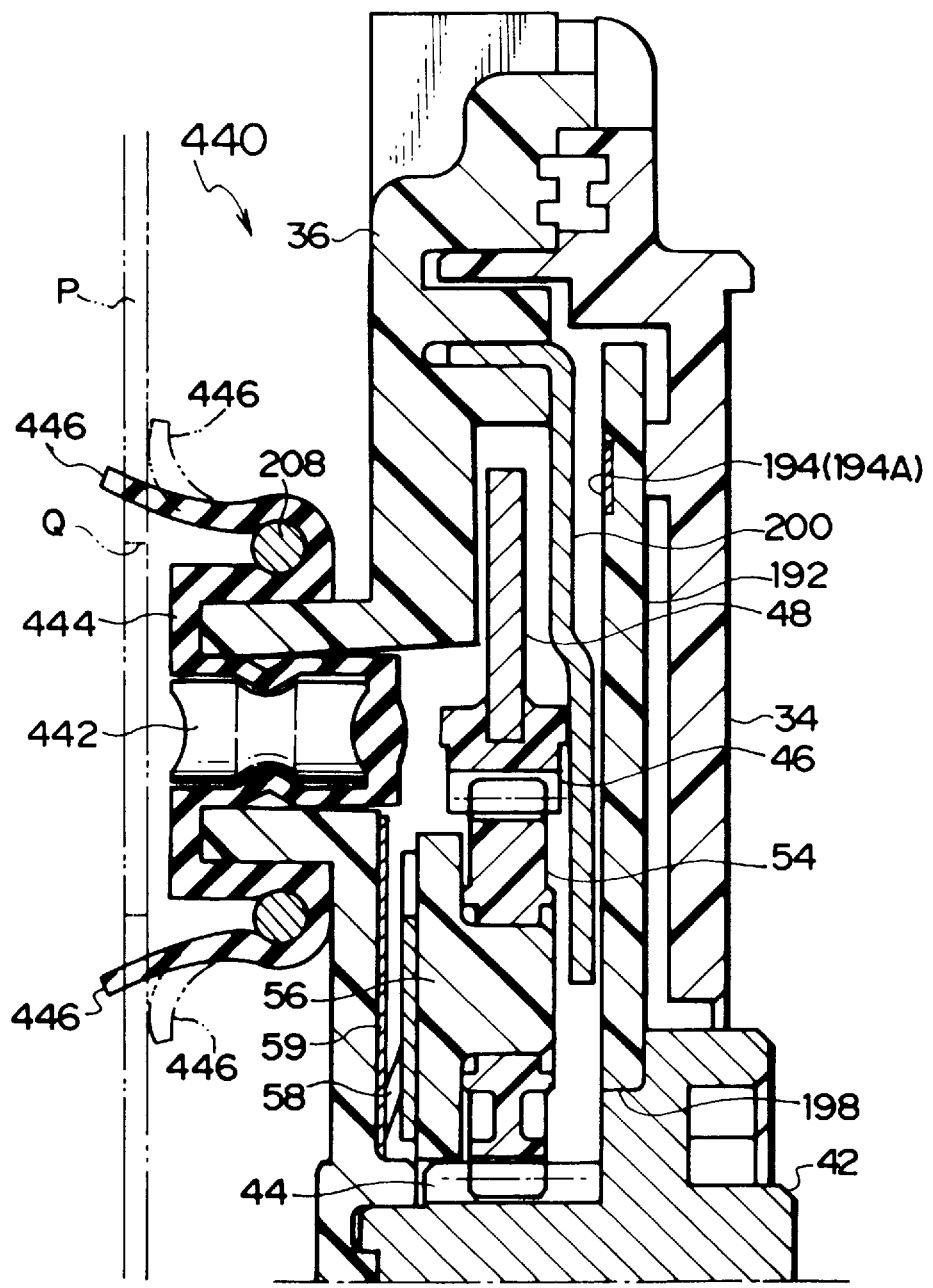
FIG. 12 is an enlarged sectional view of a main portion of a position detecting device in accordance with a sixth embodiment of the present invention.

FIG. 12 shows an enlarged sectional view of a main portion of a position detecting device 440 in accordance with a sixth embodiment of the present invention.

The position detecting device 440 has a pushing button 442 and a rubber 444. The pushing button 442 is basically the same as the pushing button 202 in the above-mentioned first embodiment. However, the pushing button 442 is accommodated into the rubber 444 in a state in which the pushing button 442 is not externally projected. Therefore, the flange portion 48 is pushed by pushing this pushing button 442 from its exterior by a jig so that rotation of the ring gear 46 can be prevented.

In contrast to this, a lip portion 446 is formed at a peripheral edge (an end tip portion on the side of a cover plate 36) of the rubber 444. The lip portion 446 is extended outward.

An operating hole Q is formed in an inner panel P of a vehicle door to which this position detecting device 440 is applied. The operating hole Q is located in a position opposed to the pushing button 442 in a state in which the position detecting device 440 is assembled into the vehicle door. Therefore, it is possible to push the pushing button 442 from an outer side of the door inner panel P through this operating hole Q.

In this case, when the position detecting device 440 is assembled into the vehicle door, as shown by a two-dotted chain line in FIG. 12, the lip portion 446 of the rubber 444 comes in contact with the door inner panel P (a peripheral wall of the operating hole Q) so that a sealing property of the operating hole Q can be secured.

The position detecting device 440 can be also reliably assembled into the vehicle body in a normal assembly state irrespective of the rotating position of the shaft 20 (the moving position of a window glass) of the motor 10 if the motor 10 is driven by pushing the pushing button 442 from its exterior by a jig in the assembly of the position detecting device into the vehicle body. Accordingly, an original function of the position detecting device can be reliably maintained.

In this case, the pushing button 442 can be pushed from the outer side of the door inner panel P through the operating hole Q formed in the door inner panel P. Therefore, the initial setting of the device 440 can be carried out without detaching the position detecting device 440 from the interior of the door inner panel P so that operability is extremely improved.

Further, the lip portion 446 of the rubber 444 comes in press contact with the door inner panel P (a peripheral wall of the operating hole Q) and is assembled so that the operating hole Q is covered. Therefore, the sealing property of the operating hole Q can be also secured.

(Seventh embodiment)

Figure 13:
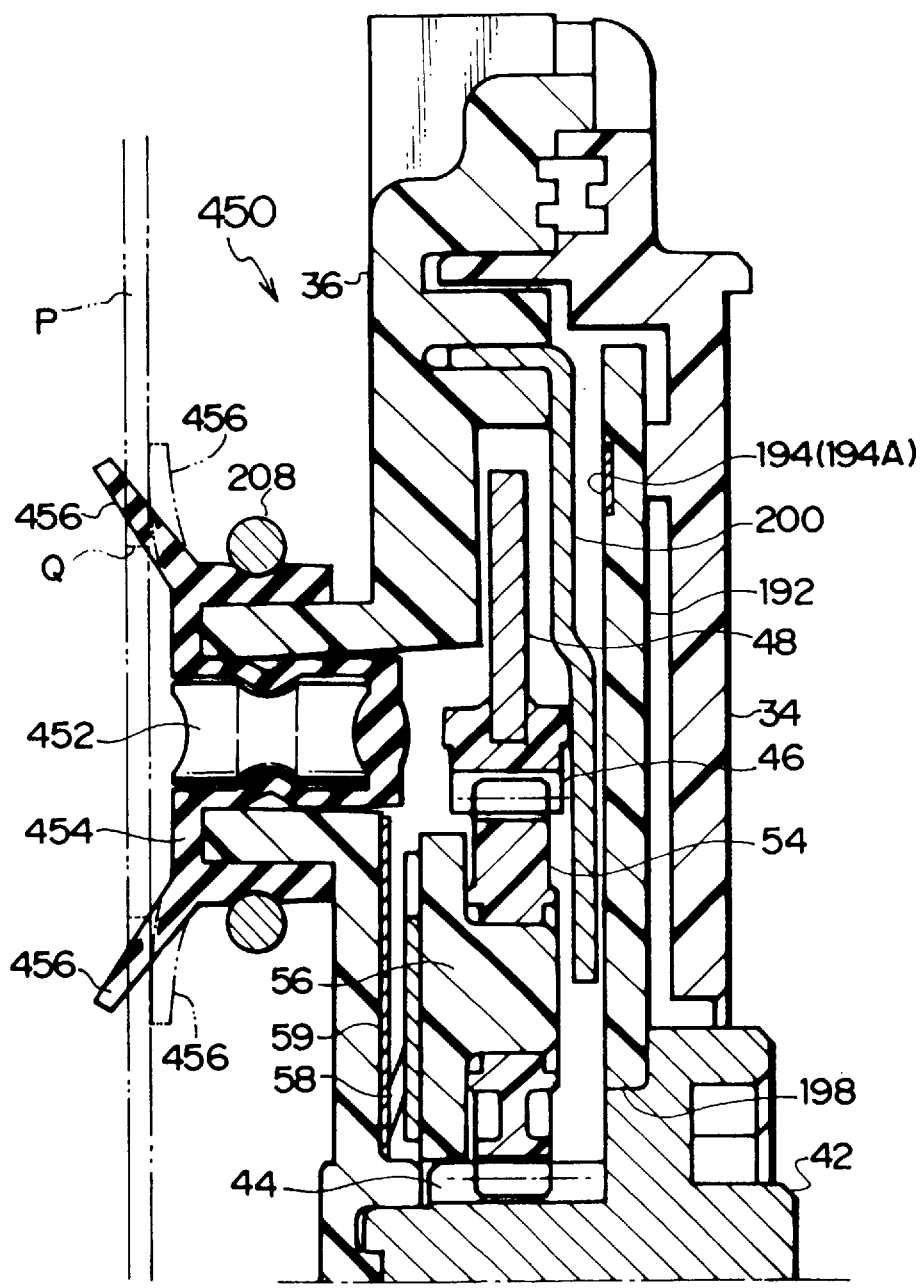
FIG. 13 is an enlarged sectional view of a main portion of a position detecting device in accordance with a seventh embodiment of the present invention.

FIG. 13 shows an enlarged sectional view of a main portion of a position detecting device 450 in accordance with a seventh embodiment of the present invention.

The position detecting device 450 is basically the same as the position detecting device 440 in the above-mentioned sixth embodiment. However, the position detecting device 450 has a pushing button 452 and a rubber 454. A lip portion 456 is formed in an end tip angular portion (an end tip portion on a side opposed to a cover plate 36) of the rubber 454. Similar to the above case, the lip portion 456 comes in contact with a door inner panel P (a peripheral wall of an operating hole Q) as shown by a two-dotted chain line in FIG. 13 when this position detecting device 450 is assembled into a vehicle door. Thus, a sealing property of the operating hole Q can be secured.

The position detecting device 450 can be also reliably assembled into a vehicle body in a normal assembly state irrespective of the rotating position of the shaft 20 (the moving position of a window glass) of the motor 10 if the motor 10 is driven by pushing the pushing button 452 from its exterior by a jig in the assembly of the position detecting device into the vehicle body. Accordingly, an original function of the position detecting device can be reliably maintained.

In this case, the pushing button 452 can be also operated from an outer side of the door inner panel P through the operating hole Q formed in the door inner panel P. Therefore, the initial setting of the device 450 can be effected without detaching the position detecting device 450 from the interior of the door inner panel P so that operability is extremely improved.

Further, the lip portion 456 of the rubber 454 comes in press contact with the door inner panel P (the peripheral wall of the operating hole Q) and is assembled so that the sealing property of the operating hole Q can be also secured.

(Eighth embodiment)

Figure 14:
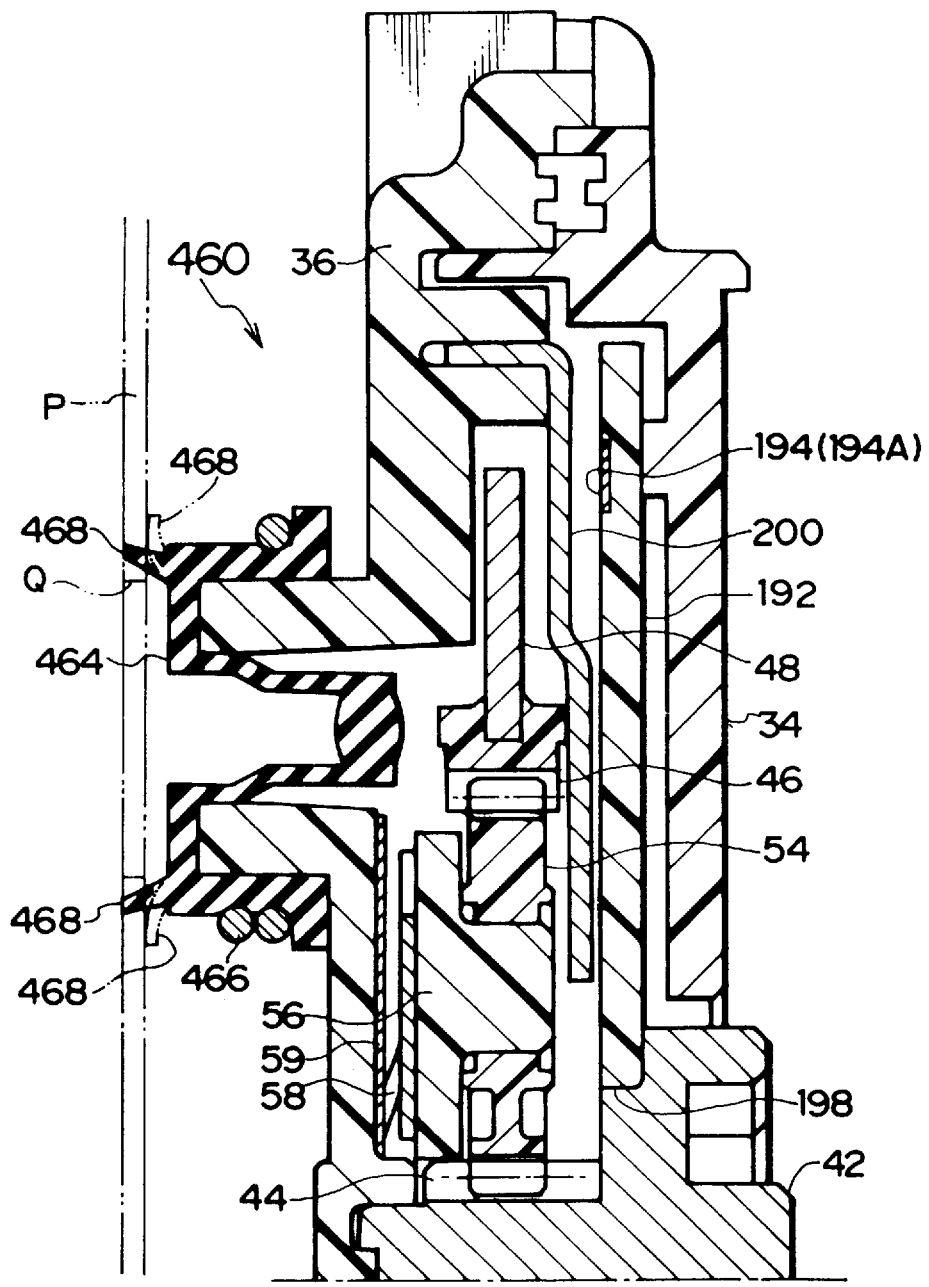
FIG. 14 is an enlarged sectional view of a main portion of a position detecting device in accordance with an eighth embodiment of the present invention.

FIG. 14 shows an enlarged sectional view of a main portion of a position detecting device 460 in accordance with an eighth embodiment of the present invention.

The position detecting device 460 is basically the same as the position detecting device 450 in the above-mentioned seventh embodiment. However, a pushing button is not provided in the position detecting device 460. The position detecting device 460 has a rubber 464 and a holding spring 466. A lip portion 468 is formed in an end tip angular portion (an end tip portion on a side opposed to a cover plate 36) of the rubber 464. Similar to the above case, the lip portion 468 comes in contact with the door inner panel P (a peripheral wall of an operating hole Q) as shown by a two-dotted chain line in FIG. 14 when this position detecting device 460 is assembled into a vehicle door. Thus, a sealing property of the operating hole Q can be secured.

The position detecting device 460 can be also reliably assembled into a vehicle body in a normal assembly state irrespective of the rotating position of the shaft 20 (the moving position of a window glass) of the motor 10 if the motor 10 is driven by simultaneously pressing and operating the rubber 464 from its exterior by a jig in the assembly of the position detecting device into the vehicle body. In this case, the rubber 464 can be also operated from an outer side of the door inner panel P through the operating hole Q so that operability is improved.

Further, the lip portion 468 of the rubber 464 comes in press contact with the door inner panel P (the peripheral wall of the operating hole Q) and is assembled so that the sealing property of the operating hole can be secured.

(Ninth embodiment)

Figure 15:
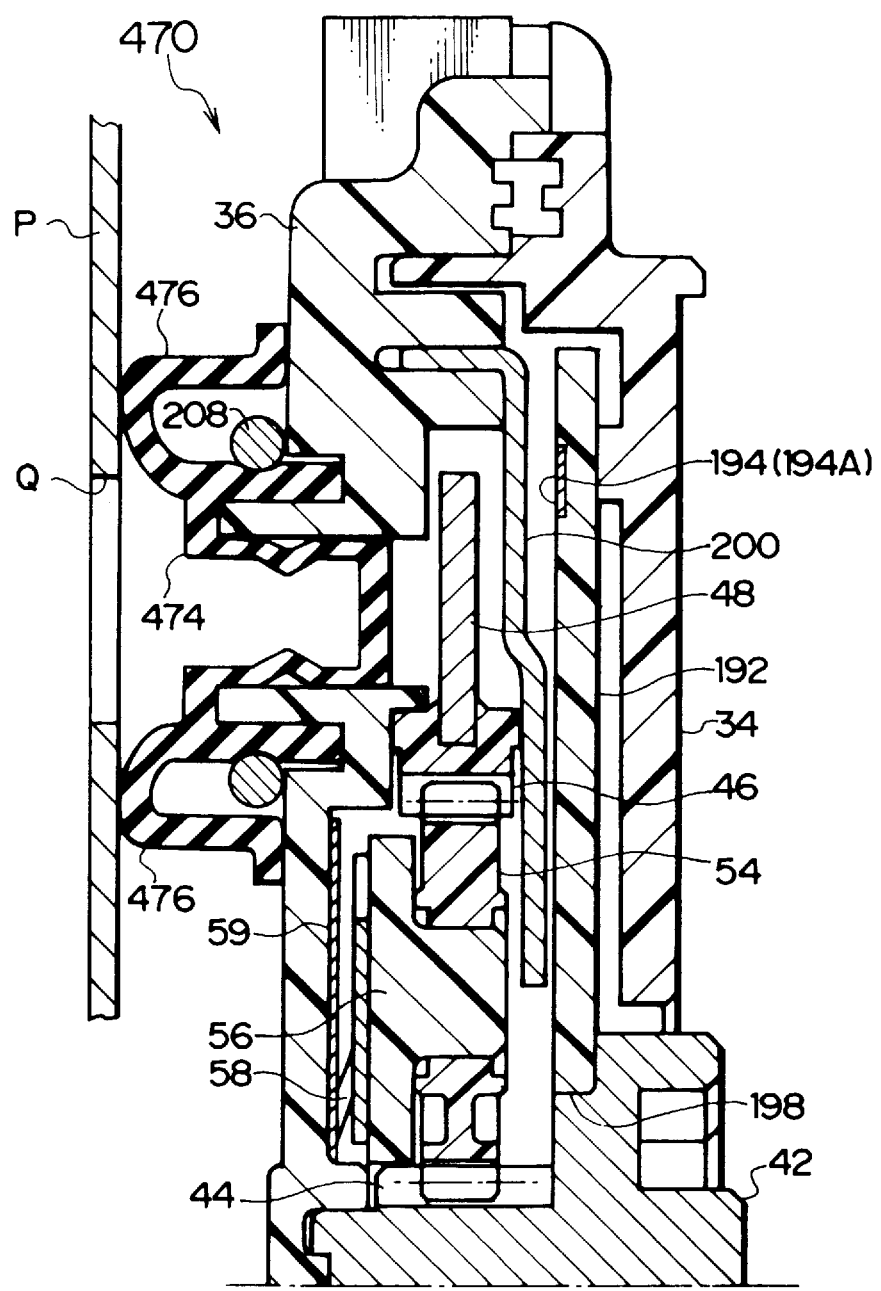
FIG. 15 is an enlarged sectional view of a main portion of a position detecting device in accordance with a ninth embodiment of the present invention.

FIG. 15 shows an enlarged sectional view of a main portion of a position detecting device 470 in accordance with a ninth embodiment of the present invention.

The position detecting device 470 is basically the same as the position detecting device 460 in the above-mentioned eighth embodiment. However, the position detecting device 470 has a rubber 474. The rubber 474 is arranged in a position opposed to the flange portion 48 of the ring gear 46. The flange portion 48 is pushed by pushing the rubber 474 so that rotation of the ring gear 46 can be prevented. A lip portion 476 is formed in an end tip angular portion (an end tip portion on a side opposed to the cover plate 36) of the rubber 474. The lip portion 476 is formed in a U-shape in cross section and the end tip portion of this lip portion 476 comes in press contact with the cover plate 36. Similar to the above case, a U-shaped intermediate portion of this lip portion 476 comes in press contact with a door inner panel P (a peripheral wall of an operating hole Q) as shown in FIG. 15 when the position detecting device 470 is assembled into a vehicle door. Thus, a sealing property of the operating hole can be secured.

The position detecting device 470 can be also reliably assembled into a vehicle body in a normal assembly state irrespective of the rotating position of the shaft 20 (the moving position of a window glass) of the motor 10 if the motor 10 is driven by pushing the rubber 474 from its exterior by a jig in the assembly of the position detecting device into the vehicle body. Thus, operability is improved and the sealing property of the operating hole can be also secured.

(Tenth embodiment)

Figure 16:
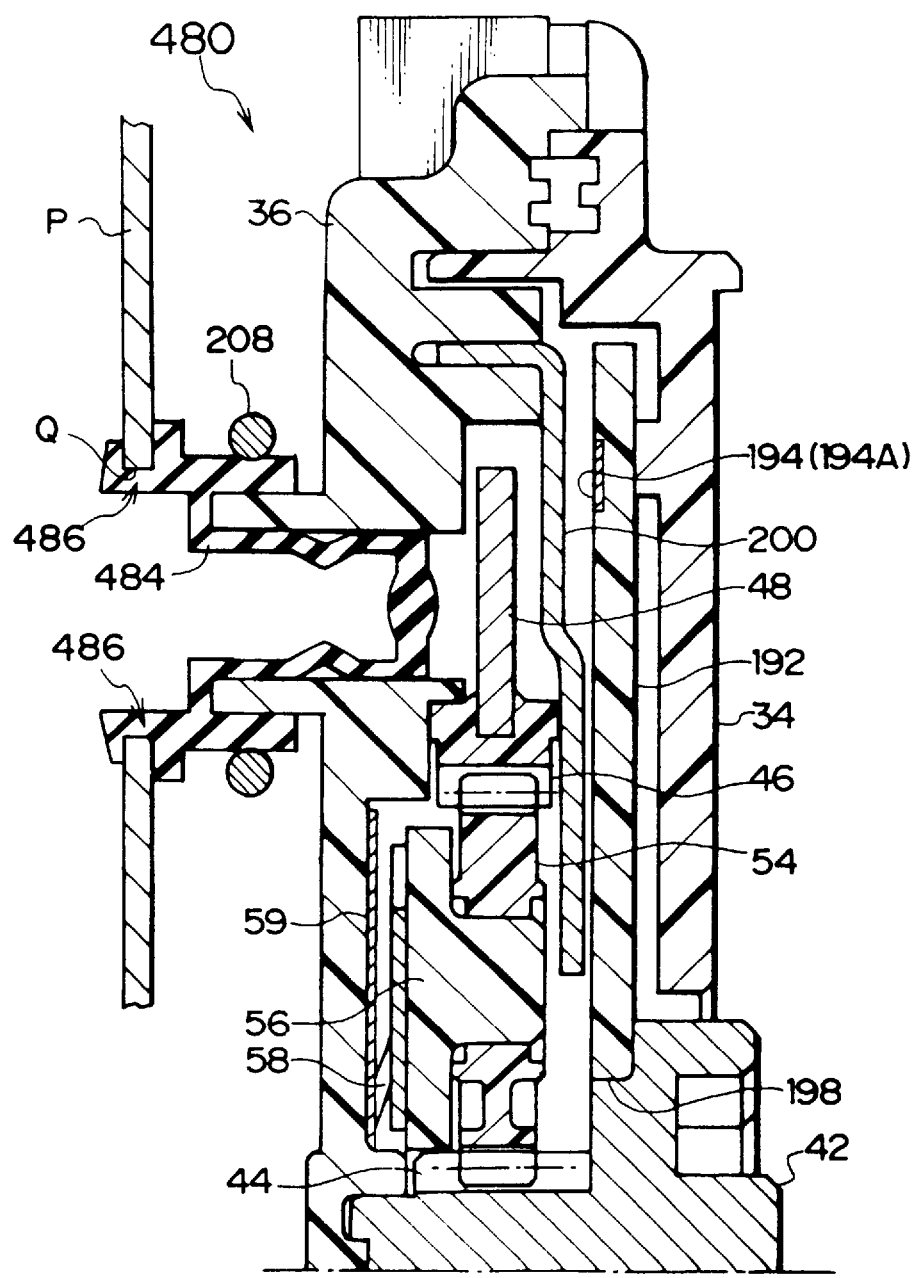
FIG. 16 is an enlarged sectional view of a main portion of a position detecting device in accordance with a tenth embodiment of the present invention.

FIG. 16 shows an enlarged sectional view of a main portion of a position detecting device 480 in accordance with a tenth embodiment of the present invention.

The position detecting device 480 is basically the same as the position detecting device 470 in the above-mentioned ninth embodiment. However, the position detecting device 480 has a rubber 484. The rubber 484 is arranged in a position opposed to the flange portion 48 of the ring gear 46. The flange portion 48 is pressed by pressing and operating the rubber 484 so that rotation of the ring gear 46 can be prevented. A fitting portion 486 is formed in an end tip angular portion (an end tip portion on a side opposed to the cover plate 36) of the rubber 484. The fitting portion 486 is formed in a U-shape in cross section. When the position detecting device 480 is assembled into a vehicle door, a U-shaped portion of the fitting portion 486 is fitted into an operating hole Q of a door inner panel P as shown in FIG. 16 so that a sealing property of the operating hole Q can be secured.

The position detecting device 480 can be also reliably assembled into a vehicle body in a normal assembly state irrespective of the rotating position of the shaft 20 (the moving position of a window glass) of the motor 10 if the motor 10 is driven by pushing the rubber 484 from its exterior by a jig in the assembly of the position detecting device into the vehicle body. Thus, operability is improved and the sealing property of the operating hole can be also secured.

In each of the above-mentioned embodiments, the position detecting devices 30, 400, 410, 420, 430, 440, 450, 460, 470, 480, etc. are directly applied to the motor 10 for a power window device as an example. However, these position detecting device 30, etc. are not limited to such a direct application to the motor 10, but can be naturally applied to other mechanisms and portions. For example, each of the position detecting devices 30, etc. may be disposed in an arm rotating supporting shaft of a window regulator device of an X-arm type, etc. Further, each of the position detecting device 30, etc. may be provided in a pulley for wire winding of a window regulator device of a wire type. In each of these cases, the position of a window glass can be also detected with high precision and a movement of the window glass can be controlled with high precision. Further, an initial position of the window glass can be easily set without making any complicated adjustment of an assembly position in the assembly of each of the position detecting devices and performing any complicated resetting operation after this assembly.

In each of the above-mentioned embodiments, each of the position detecting device 30, etc. is constructed such that the rotating position of an output shaft (shaft 20) of the motor 10 for a power window device is detected and controlled. However, the present invention is not limited to this construction, but can be also applied to a case in which the moving position of a moving body linearly reciprocated (for example, a sun roof moved on a guide rail, etc.) is detected and controlled.

What is claimed is:

1. A position detecting device of a moving body for detecting a predetermined moving position of the moving body, comprising:

a planetary gear set that has a ring gear rotatably held by a cover plate of said position detecting device and a planetary gear engaged with said ring gear, and that is operated interlockingly with said moving body by a moving force transmitted from the moving body moved in a forward direction and a reverse direction;

a switch section that has a moving contact provided integrally with the ring gear of said planetary gear set and rotated together with the ring gear and that has a fixed contact fixed to said cover plate and able to come in contact with said moving contact, said switch section able to detect the predetermined moving position of said moving body by turning one of an on and an off operation of the switch section;

a clutch mechanism that usually transmits the moving force of said moving body from said planetary gear to said ring gear by preventing revolution of the planetary gear of said planetary gear set so as to rotate the ring gear, and that cuts off the transmission of a rotating force in the forward direction from said moving body to said ring gear by enabling the revolution of said planetary gear in a state in which said switch section has been operated; and an initial position setting mechanism that is provided such that the ring gear of said planetary gear set can be operated from the exterior of said cover plate, and can compulsorily prevent the rotation of said ring gear regardless of the moving position of said moving body.

2. A position detecting device of the moving body according to claim 1, wherein a detecting position of said moving body is a rotating position of an output shaft of the motor.

3. A position detecting device of the moving body according to claim 1, wherein said initial position setting mechanism is constructed by a ring gear pushing member for pushing said ring gear and compulsorily preventing the rotation of the ring gear.

4. A position detecting device of the moving body according to claim 3, further comprising a protective wall which is disposed in the vicinity of said ring gear pushing member and is projected by a length longer than a projecting length of the ring gear pushing member projected toward the exterior of the position detecting device of said moving body.

5. A position detecting device of the moving body according to claim 3, wherein said cover plate has a first operating hole able to operate the ring gear of said planetary gear set from its exterior.

6. A position detecting device of the moving body according to claim 5, further comprising a seal member which seals said first operating hole and prevents a foreign object from entering the interior of the position detecting device of said moving body from its exterior.

7. A position detecting device of the moving body according to claim 6, wherein said ring gear pushing member presses said ring gear through said seal member.

8. A position detecting device of the moving body according to claim 5, wherein said seal member is constructed by rubber.

9. A vehicle door comprising the position detecting device of the moving body according to claim 3, wherein the position detecting device of said moving body is disposed within a door inner panel, and a second operating hole able to operate said initial position setting mechanism is formed in said door inner panel.

10. A position detecting device of the moving body according to claim 1, wherein, after said switch section is operated, the ring gear is not moved and the operating state of the switch section is maintained even when said moving body is moved in the forward direction.

11. A position detecting device of the moving body according to claim 1, wherein an initial state in which said switch section is operated can be set by moving said moving body to a position equal to or exceeding a predetermined position in the forward direction.

12. A position detecting device of the moving body according to claim 1, wherein an initial state in which said switch section has been operated can be set by moving said moving body in the reverse direction in a state in which the rotation of the ring gear of said planetary gear set is prevented, and moving said moving body in the forward direction in a state in which the ring gear can be rotated.

13. A position detecting device of the moving body according to claim 1, wherein said cover plate has a first operating hole able to operate the ring gear of said planetary gear set from its exterior.

14. A vehicle door comprising the position detecting device of the moving body according to claim 13, wherein the position detecting device of said moving body is disposed within a door inner panel, and a second operating hole able to operate said initial position setting mechanism is formed in said door inner panel.

15. A vehicle door comprising the position detecting device of the moving body according to claim 14, wherein a center of said second operating hole is substantially the same as a center of said first operating hole.

16. A position detecting device of the moving body according to claim 13, further comprising a seal member which seals said first operating hole and prevents a foreign object from entering the interior of the position detecting device of said moving body from its exterior.

17. A vehicle door comprising the position detecting device of the moving body according to claim 16, wherein the position detecting device of said moving body is disposed within a door inner panel, and a second operating hole able to operate said initial position setting mechanism is formed in said door inner panel.

18. A vehicle door comprising the position detecting device of the moving body according to claim 17, wherein said seal member is projected up to at least said inner panel to prevent a foreign object from entering the interior of the position detecting device of said moving body from the exterior of said door inner panel.

19. A vehicle door comprising the position detecting device of the moving body according to claim 1, wherein the position detecting device of said moving body is disposed within a door inner panel, and a second operating hole able to operate said initial position setting mechanism is formed in said door inner panel.

* * * * *